US012245633B2

(12) United States Patent
Batista et al.

(10) Patent No.: US 12,245,633 B2
(45) Date of Patent: Mar. 11, 2025

(54) INDUCTIVELY HEATING AEROSOL-GENERATING DEVICE WITH A MULTI-WIRE INDUCTION COIL

(71) Applicant: Philip Morris Products S.A., Neuchatel (CH)

(72) Inventors: Rui Nuno Batista, Morges (CH); Daria Tzimoulis, La Croix-sur-Lutry (CH); Adela Sahraoui, Lausanne (CH)

(73) Assignee: Philip Morris Products S.A., Neuchatel (CH)

( * ) Notice: Subject to any disclaimer, the term of this patent is extended or adjusted under 35 U.S.C. 154(b) by 477 days.

(21) Appl. No.: 17/782,827

(22) PCT Filed: Dec. 10, 2020

(86) PCT No.: PCT/EP2020/085405
§ 371 (c)(1),
(2) Date: Jun. 6, 2022

(87) PCT Pub. No.: WO2021/116241
PCT Pub. Date: Jun. 17, 2021

(65) Prior Publication Data
US 2023/0010295 A1 Jan. 12, 2023

(30) Foreign Application Priority Data
Dec. 11, 2019 (EP) .................................... 19386054

(51) Int. Cl.
*A24F 40/465* (2020.01)
*H05B 6/10* (2006.01)
*H05B 6/36* (2006.01)

(52) U.S. Cl.
CPC ........... *A24F 40/465* (2020.01); *H05B 6/105* (2013.01); *H05B 6/362* (2013.01); *H05B 6/365* (2013.01)

(58) Field of Classification Search
None
See application file for complete search history.

(56) References Cited

U.S. PATENT DOCUMENTS 4,776,353 A * 10/1988 Lilja ...................... A24B 15/18 131/273
5,613,505 A 3/1997 Campbell et al.
(Continued)

FOREIGN PATENT DOCUMENTS

CN 206137197 U * 5/2017
DE 199 29 344 A1 12/2000
(Continued)

OTHER PUBLICATIONS

CN-206137197-U's English Translation (Year: 2016).*
(Continued)

*Primary Examiner* — Manley L Cummins, IV
(74) *Attorney, Agent, or Firm* — Oblon, McClelland, Maier & Neustadt, L.L.P.

(57) ABSTRACT

An aerosol-generating device for generating an aerosol by inductively heating an aerosol-forming substrate is provided, the device including: a device housing including a cavity to removably receive the substrate; an inductive heating arrangement including an induction coil configured to generate an alternating magnetic field within the cavity in a range between 500 kHz to 30 MHz, the coil being formed by a plurality of turns of a composite cable arranged around the cavity, the cable including a first side facing inward towards the cavity, a second side opposite to the first side facing outward away from the cavity, and an electrical conductor embedded in an insulating conductor encasement and including non-insulated wires in electrical contact with each other, and the conductor being arranged asymmetri-
(Continued)

cally with regard to an outer cross-section of the cable to be closer to the first side than to the second side.

17 Claims, 7 Drawing Sheets

(56) References Cited

U.S. PATENT DOCUMENTS

| | | | | |
|---|---|---|---|---|
| 2002/0105343 | A1* | 8/2002 | Scheible | H02J 50/12<br>324/644 |
| 2017/0055585 | A1* | 3/2017 | Fursa | A24F 40/46 |
| 2017/0055587 | A1* | 3/2017 | Zinovik | H03F 3/2176 |
| 2017/0079326 | A1* | 3/2017 | Mironov | H05B 6/108 |
| 2018/0317554 | A1* | 11/2018 | Kaufman | A24F 40/42 |
| 2019/0182909 | A1* | 6/2019 | Fursa | A24F 40/465 |
| 2019/0313695 | A1 | 10/2019 | Kaufman et al. | |
| 2020/0245683 | A1 | 8/2020 | Batista et al. | |
| 2021/0145061 | A1* | 5/2021 | Fursa | A24F 40/465 |

FOREIGN PATENT DOCUMENTS

| | | | | |
|---|---|---|---|---|
| EP | 0 703 735 | B1 | 7/2001 | |
| RU | 2 643 421 | C2 | 2/2018 | |
| RU | 2 670 060 | C2 | 10/2018 | |
| RU | 2 677 111 | C2 | 1/2019 | |
| WO | WO 2015/177253 | A1 | 11/2015 | |
| WO | WO-2017068098 | A1 * | 4/2017 | A24D 1/002 |
| WO | WO 2018/041450 | A1 | 3/2018 | |
| WO | WO 2019/030000 | A1 | 2/2019 | |
| WO | WO 2019/030361 | A1 | 2/2019 | |

OTHER PUBLICATIONS

Russian Office Action and Search Report issued Apr. 8, 2024 in corresponding Russian Patent Application No. 2022118628 (with partial English translation), 9 pages.

International Search Report issued Feb. 26, 2021 in PCT/EP2020/085405, filed on Dec. 10, 2020, 6 pages.

Written Opinion issued Feb. 26, 2021 in PCT/EP2020/085405, filed on Dec. 10, 2020, 9 pages.

International Preliminary Report on Patentability issued Mar. 22, 2022 in PCT/EP2020/085405, filed on Dec. 10, 2020, 15 pages.

* cited by examiner

INDUCTIVELY HEATING AEROSOL-GENERATING DEVICE WITH A MULTI-WIRE INDUCTION COIL

The present disclosure relates to an inductively heating aerosol-generating device for use with a substrate that is capable to form an inhalable aerosol upon heating. The invention further relates to an aerosol-generating system comprising such a device and an aerosol-generating article which comprises the aerosol-forming substrate to be heated.

Aerosol-generating devices used for generating inhalable aerosols by inductively heating an aerosol-forming substrate are generally known from prior art. Typically, such devices comprise a cavity for removably receiving the substrate and an inductive heating arrangement for generating an alternating magnetic field within the cavity. Within the cavity, the field is used to induce at least one of heat generating eddy currents or hysteresis losses in a susceptor which in turn is arranged in thermal proximity or direct physical contact with the substrate to be heated. Both, the aerosol-forming substrate and the susceptor may be integral part of an aerosol-generating article that is receivable in the cavity. Alternatively, only the substrate may be comprised in the article, whereas the susceptor may be part of the device.

For generating the alternating magnetic field within the cavity, the inductive heating arrangement usually comprises an induction coil that is formed by a plurality of turns of an electrical conductor arranged around at least a portion of the cavity. Typically, the volume of the cavity roughly corresponds to the substrate volume of a single user experience and, thus, is only in the order a few cubic centimeters. This holds in particular for handheld aerosol-generating devices. Accordingly, the radius of the induction coil usually is small. This may cause the manufacturing of the coil to be rather complex or even prone to errors and, thus, may result in faulty or non-functional devices. Besides that, it would often be desirable to have a special cross-section profile of the electrical conductor, for example to make optimum use of the limited installation space in such devices. However, electrical conductors having a special cross-section, such as a rectangular cross-section, usually are more expensive than electrical conductors having a standard cross-section. This may cause the manufacturing of such devices to be more cost-intensive.

Accordingly, there is need for an inductively heating aerosol-generating device and an aerosol-generating system with the advantages of prior art solutions, whilst mitigating their limitations. In particular, it would be desirable to have an inductively heating aerosol-generating device and system including an induction coil which can be manufactured in a simple, customized and cost-effective manner, in particular with a low failure rate.

According to the present invention, there is provided an aerosol-generating device for generating an aerosol by inductively heating an aerosol-forming substrate. The device comprises a device housing comprising a cavity. The cavity is configured for removably receiving at least a portion of the aerosol forming substrate to be heated. The aerosol-generating device further comprises an inductive heating arrangement comprising an induction coil for generating an alternating magnetic field within the cavity. The induction coil is formed by a plurality of turns of a composite cable arranged around at least a portion of the cavity. The composite cable comprises an electrical conductor embedded at least partially in an insulating conductor encasement. The electrical comprises a plurality of non-insulated wires in electrical contact with each other.

According to the invention, it has been recognized that the limitations of inductions coils formed by an electrical conductor comprising a single solid wire are mainly due to the rigid character of the solid wire. In particular when it comes to small winding radii, winding of an electrical conductor comprising a single solid wire may cause high mechanical stress in the wire material which in turn may result in material fatigue or even material breaks and thus in a faulty or even non-functional coil. In contrast, a conductor comprising a plurality of non-insulated wires in electrical contact with each other is more flexible than a conductor comprising a solid wire of the same total cross-sectional area. Therefore, winding of an electrical conductor comprising a plurality of non-insulated wires is easier and less prone to material fatigue or even material breaks. Furthermore, the plurality of non-insulated wires may be arranged within the composite in various configurations such as to realize different cross-sectional shapes of the conductor. Advantageously, this allows for a cost-effective manufacturing of an induction cable comprising an electrical conductor having a customized cross-sectional shape.

The plurality of non-insulated wires are in electrical contact with each other such as to act as a single conductor, in particular such as to have substantially the same electrical properties, in particular substantially the same electrical resistance, as a single conductor having the same total cross-sectional area.

The plurality of non-insulated wires in electrical contact with each other may also be denoted as a stranded wire. A stranded wire is composed of a number of wires bundled or wrapped together to form a composite conductor. Therefore, the electrical conductor according to the present invention may also be denoted as composite (electrical) conductor comprising a plurality of non-insulated wires in electrical contact with each other or comprising a stranded wire, respectively.

In general, the plurality of non-insulated wires may be arranged in different configurations: The wires may be bundled together or twisted together or braided together or wrapped together. Likewise, the wires may run parallel to each other along a length extension of the composite cable, in particular without crossing each other and without being braided or wrapped together. In a parallel arrangement, the contact between adjacent wires is along a line, but not in a few points only. Advantageously, this results in a larger contact area which increases the electrical contact between the wires as compared a contact in a few points only. In addition, a linear contact area also reduces mechanical stress between the wires and thus improves the flexibility and the bending strength of the electrical conductor.

Preferably, the wires may run parallel to each other along a length extension of the composite cable either in a single layer or in a plurality of layers on top of each other, in particular in two, three or four layers on top of each other, wherein the layers are arranged parallel to each other. That is, the wires may be arranged in parallel next to each other in a single row or plane. Or the wires may be arranged in parallel next to each other in a plurality of rows on top of each other, in particular in two, three or four rows one on top of each other.

In the multi-layer configuration, at least a part of the wires of each layer (row) preferably is arranged in grooves formed between adjacent wires of an adjacent layer (row). This staggered arrangement is very compact and thus allows for a compact design of the electrical conductor.

The single layer or each of the plurality of layers may be a flat layer. As used herein, the term flat layer refers to a configuration in which the single layer or each of the plurality of layers is aligned along a straight line as seen in a cross-sectional view of the composite cable transvers to the length extending of the cable, that is, transverse to the winding direction of the cable around the cavity. In other words, the wires of the single layer or the wires in each one of the plurality of layers run parallel to each other on the same flat plane. A flat configuration of the layers may be particularly advantageous for helically winding the composite cable such as to form cylindrical induction coil.

Likewise, the single layer or each of the plurality of layers may be a curved layer. As used herein, the term curved layer refers to a configuration in which the single layer or each of the plurality of layers is aligned along a curved line as seen in a cross-sectional view of the composite cable transvers to the length extending of the cable, that is, transverse to the winding direction of the cable around the cavity. In other words, the wires of the single layer or the wires in each one of the plurality of layers run parallel to each other on the same curved plane. A curved configuration of the layers may be particularly advantageous for winding the composite cable around a body forming the cylindrical cavity, wherein the outer surface of the body is curved in direction transverse to the winding direction.

Preferably, the single layer or each of the plurality of layers is parallel to a circumferential plane defined by the plurality of turns of the composite cable. In this configuration, the radial extension of the induction coil is very compact.

In any of these layered configurations, the wires do not cross each other and are not braided or wrapped together either. In particular, the wires are not twisted. Accordingly, the mechanical stress between the wires is even further reduced resulting in an even better flexibility and bending strength of the electrical conductor.

In addition, arranging the wires in a layered configuration is particularly suitable for realizing different cross-sectional shapes of the electrical conductor. For example, the conductor may comprise twenty wires running parallel to each other along a length extension of the composite cable in two flat layers on top of each other, wherein each layer comprises ten wires arranged next to each other. In this configuration, the assembly of all the wires may form an electrical conductor with a substantially rectangular cross-section in case each wire of one layer is arranged on top of a wire of the adjacent layer. Likewise, the assembly of all the wires may form an electrical conductor with a substantially parallelogram-shaped cross-section in case the layers are shifted relative to each other such that wires of one layer are arranged in grooves formed between adjacent wires of the adjacent layer.

Each wire of the plurality of wires may have one of: a circular outer cross-section or an elliptical outer cross-section or an oval outer cross-section or a rectangular outer cross-section or a square outer cross-section. Wires having circular outer cross-section may be preferred for economic reasons due to their good availability as standard wires.

Each wire of the plurality of wires may have a diameter in a range between 0.2 millimeter and 2.3 millimeter, in particular between 0.25 millimeter and 1.2 millimeter, or in a range between 0.15 millimeter and 1.5 millimeter, in particular between 0.25 millimeter and 0.75 millimeter.

Likewise, each wire of the plurality of wires may have a cross-sectional area in a range between 0.1 square millimeter and 17 square millimeter, in particular between 0.2 square millimeter and 4.5 square millimeter, or in a range between 0.07 square millimeter and 7 square millimeter, in particular between 0.2 square millimeter and 1.8 square millimeter.

Advantageously, the wires of the electrical conductor are embedded in the material of the insulating conductor encasement by extrusion or lamination.

In general, the composite cable may have any outer cross-section as seen in a cross-sectional view of the composite cable transvers to the length extending of the cable or transverse to the winding direction of the cable around the cavity, respectively. For example, the composite cable may have a substantially circular outer cross-section or a substantially rectangular outer cross-section or a substantially square outer cross-section or a substantially elliptical outer cross-section or a substantially oval outer cross-section or a substantially parallelogram-shaped outer cross-section or a substantially trapezoid outer cross-section or a substantially arc-shaped outer cross-section. In particular, the composite cable may have a non-circular outer cross-section, such as a substantially rectangular outer cross-section or a substantially square outer cross-section or a substantially elliptical outer cross-section or a substantially oval outer cross-section or a substantially parallelogram-shaped outer cross-section or a substantially trapezoid outer cross-section or a substantially arc-shaped outer cross-section. A substantially arc-shaped cross-section has a shape of an arc or an arc segment.

Preferably, the composite cable is a flat composite cable. That is, an outer cross-section of the composite cable has a width dimension and a thickness dimension, wherein the thickness dimension is smaller than the width extension. Advantageously, a flat composite cable allows for a compact design of the induction coil. In this configuration, the composite cable has a non-circular or non-quadratic outer cross-section. That is, the outer cross-section of the composite cable is neither circular nor quadratic. For example, the outer cross-section of the composite cable is substantially rectangular, substantially elliptical, substantially oval, substantially parallelogram-shaped, substantially trapezoid or a substantially arc-shaped. In this configuration layer, the composite cable may also be denoted as a multi-wire planar cable or a ribbon cable.

The composite cable may comprise—upon being arranged around the cavity—a first side facing inwards towards the cavity and a second side opposite to the first side facing outwards away from the cavity. For example in case of a rectangular outer cross-section, the first side corresponds to that side of the rectangular outer cross-section which faces the inwards towards the cavity. Likewise, the second side corresponds to that side of the rectangular outer cross-section opposite the first side, that is, to the side of the rectangular outer cross-section which faces outwards away from the cavity. In case of an elliptical outer cross-section, the first side corresponds to the half side of the elliptical outer cross-section which faces the inwards towards the cavity.

The outer cross-section, in particular the non-circular outer cross-section of the composite cable may have a first axis of symmetry, in particular a first axis of symmetry extending in a radial direction with respect to the plurality of turns of the composite cable. In particular, the first axis of symmetry may extend between the first side and the second side of the composite cable. Alternatively or in addition, the outer cross-section, in particular the non-circular outer cross-section of the composite cable may have a second axis of symmetry transverse, in particular perpendicular to the first axis of symmetry. That is, the non-circular outer cross-section of the composite cable may have a second axis of symmetry extending transverse, in particular perpendicular to a radial direction with respect to the plurality of turns of the composite cable.

A maximum dimension of the cross-section of the composite cable in a radial direction with respect to the plurality of turns of the composite cable, in particular a maximum dimension of the composite cable along an axis normal to the first side and to the second side, in particular a maximum thickness dimension of the cross-section of the composite cable, may be in a range between 0.5 millimeter and 9 millimeter, in particular between 0.7 millimeter and 9 millimeter, preferably between 0.9 millimeter and 5 millimeter.

Likewise, a maximum dimension of the cross-section of the composite cable perpendicular to a radial direction with respect to the plurality of turns of the composite cable, in particular a maximum dimension of the composite cable in a direction perpendicular to an axis normal to the first side and the second side or in a direction parallel to at least one of the first side and the second side, in particular a maximum width dimension of the cross-section of the composite cable, may be in a range between 1 millimeter and 7 millimeter, in particular between 1.5 millimeter and 5 millimeter.

The electrical conductor or a circumferential curve enveloping the electrical conductor, respectively, may have any cross-section as seen in a cross-sectional view of the composite cable transvers to the length extending of the cable or transverse to the winding direction of the cable around the cavity, respectively. For example, the electrical conductor may have a substantially circular cross-section. Likewise, the electrical conductor may have a non-circular cross-section, in particular a substantially elliptical cross-section or a substantially oval cross-section or a substantially rectangular cross-section or a substantially quadratic-cross-section or a substantially parallelogram-shaped cross-section or a substantially trapezoid cross-section or a substantially arc-shaped cross-section. A substantially arc-shaped cross-section has a shape of an arc or an arc segment. As mentioned above, different cross-sectional shapes of the electrical conductor may be realized by a corresponding arrangement of the plurality of non-insulated wires.

Preferably, the electrical conductor is a flat electrical conductor. That is, a cross-section of the electrical conductor has a width dimension and a thickness dimension, wherein the thickness dimension is smaller than the width extension. Advantageously, a flat electrical conductor allows for a compact design of the induction coil. In this configuration, the electrical conductor has a non-circular or non-quadratic outer cross-section. That is, the cross-section of the electrical conductor is neither circular nor quadratic. For example, the cross-section of the electrical conductor is substantially rectangular, substantially elliptical, substantially oval, substantially parallelogram-shaped, substantially trapezoid or a substantially arc-shaped.

A maximum dimension of the cross-section of the electrical conductor in a radial direction with respect to the plurality of turns of the composite cable in particular a maximum thickness dimension of the cross-section of the electrical conductor, in particular a maximum thickness dimension of the cross-section of the electrical conductor perpendicular to the first side, may be in a range between 0.2 millimeter and 2.3 millimeter, in particular between 0.25 millimeter and 1.2 millimeter.

Likewise, a maximum dimension of the cross-section of the electrical conductor perpendicular to a radial direction with respect to the plurality of turns of the composite cable, in particular a maximum width dimension of the cross-section of the electrical conductor, in particular a maximum width dimension of the cross-section of the electrical conductor parallel to the first side, may be in a range between 0.75 millimeter and 6 millimeter, in particular between 1 millimeter and 4 millimeter.

The electrical conductor may be arranged asymmetrically with regard to the outer cross-section of the composite cable such as to be closer to the first side of the composite cable facing inwards towards the cavity than to the second side of the composite cable side facing outwards away from the cavity. Accordingly, the insulating conductor encasement is mainly located towards the second side of the composite cable and thus radially further outside than the electrical conductor. In particular, the electrical conductor may be arranged asymmetrically with regard to the second axis of symmetry of the outer cross-section of the composite cable. As mentioned above, the second axis of symmetry may extend transverse, in particular perpendicular to a radial direction with respect to the plurality of turns of the composite cable. More particularly, the electrical conductor may be arranged between the first side and the second axis of symmetry. Due to this, the insulating conductor encasement may act as a protective sheath surrounding the conductor when the composite cable is arranged around the cavity. In addition, the asymmetric arrangement reduces the radial distance between the electrical conductor and the cavity which is advantageously with regard to the filed strength of the alternating magnetic field.

In addition or alternatively, the electrical conductor may be arranged asymmetrically with regard to a first axis of symmetry of the outer cross-section of the composite cable. As mentioned above, the first axis of symmetry may extend in a radial direction with respect to the plurality of turns of the composite cable, in particular between the first side and the second side of the composite cable.

Advantageously, the electrical conductor is arranged around the cavity as close as possible. Accordingly, a minimum distance between the electrical conductor and the first side may be at most in a range between 0.1 millimeter and 0.5 millimeter, in particular between 0.1 millimeter and 0.3 millimeter, or in range between 0.1 millimeter and 1 millimeter, in particular between 0.2 millimeter and 0.5 millimeter.

According to the invention, the conductor encasement is electrically insulating in order to electrically insulate adjacent turns of the induction coil from each other and thus to prevent a short circuit.

The insulating conductor encasement may comprise a magnetic flux concentrator material. Due to this, the insulating conductor encasement may also act as a magnetic flux concentrator. As used herein, the term “magnetic flux concentrator material” refers to a material that is able to distort the magnetic field and, thus, to concentrate and guide the magnetic field or magnetic field lines generated by an induction coil. By distorting the magnetic field towards the cavity, the magnetic flux concentrator material of the insulating conductor encasement advantageously can concentrate or focus the magnetic field within the cavity. This may increase the level of heat generated in the susceptor for a given level of power passing through the induction coil in comparison to induction coils having no flux concentrator. Thus, the efficiency of the aerosol-generating device may be improved. Furthermore, by distorting the magnetic field towards the cavity, the magnetic flux concentrator material of the insulating conductor encasement reduces the extent to which the magnetic field propagates beyond the induction coil. That is, the flux concentrator material of the insulating conductor encasement acts as a magnetic shield. Advantageously, this may reduce undesired interference of the magnetic field with other susceptive parts of the aerosol-generating device, for example with a metallic outer housing, or with susceptive external items in close proximity to the device.

In particular, having a magnetic flux concentrator material integrated the composite cable allows for providing both the induction coil and an appropriate magnetic flux concentrator in one part and, thus, in one step. Advantageously, this reduces the effort required to manufacture the aerosol-generating device both in terms of costs and time.

Furthermore, a magnetic flux concentrator as integral part of the coil winding provides good shock absorption properties. Therefore, it can withstand higher excessive force impacts or shocks without breakage as compared to other flux concentrator configurations, for example ferritic solid bodies. For example, as compared to a susceptors made from sintered ferrite powder, a magnetic flux concentrator as integral part of the coil winding offers a largely improved resistance to shock loading, such as resulting from accidental drop. In addition, a magnetic flux concentrator as integral part of the coil winding allows for a more compact design of the aerosol-generating device.

In particular, the term "magnetic flux concentrator material" refers to a material having a high relative magnetic permeability. As used herein, the term "high relative magnetic permeability" refers to a relative magnetic permeability of at least 1000, preferably at least 10000. These example values refer to the maximum values of relative magnetic permeability for frequencies up to 50 kHz and a temperature of 25 degrees Celsius. Accordingly, the magnetic flux concentrator material may comprise a material or materials having a relative magnetic permeability of at least 1000, preferably at least 10000 for frequencies up to 50 kHz and a temperature of 25 degrees Celsius. As used herein and within the art, the term "relative magnetic permeability" refers to the ratio of the magnetic permeability of a material, or of a medium, such as the flux concentrator, to the magnetic permeability of free space μ_0, where μ_0 is 4π·10−7 N·A−2 (4·Pi·10E-07 Newton per square μ_0, where In general, the insulating conductor encasement may comprise or may be made from any material or combination of materials suitable to provide flux concentrator properties. In particular, the insulating conductor encasement may comprise a flux concentrator material held in a matrix. The matrix may comprise a binder, for example a polymer, such as a silicone. Accordingly, the matrix may be a polymer matrix, such as a silicone matrix.

The insulating conductor encasement, in particular the flux concentrator material may comprise a ferrimagnetic or ferromagnetic material, for example a ferrite material, such as ferrite particles or a ferrite powder held in a matrix, or any other suitable material including ferromagnetic material such as iron, ferromagnetic steel, iron-silicon or ferromagnetic stainless steel. Likewise, the insulating conductor encasement, in particular the flux concentrator material may comprise a ferrimagnetic or ferromagnetic material, such as ferrimagnetic or ferromagnetic particles or a ferrimagnetic or ferromagnetic powder held in a matrix.

The ferromagnetic material may comprise at least one metal selected from iron, nickel and cobalt and combinations thereof, and may contain other elements, such as chromium, copper, molybdenum, manganese, aluminum, titanium, vanadium, tungsten, tantalum, silicon. The ferromagnetic material may comprise from about 78 weight percent to about 82 weight percent nickel, between 0 and 7 weight percent molybdenum and the reminder iron.

For example, the insulating conductor encasement, in particular the flux concentrator material may comprise a lamination, a pure ferrite or a proprietary iron- or ferrite based composition. More specifically, the insulating conductor encasement, in particular the flux concentrator material may comprise a lamination, a pure ferrite or a proprietary iron- or ferrite based composition available under one of the tradenames Fluxtrol 100, Fluxtrol A, Fluxtrol 50, Ferrotron 559H, from Fluxtrol, Alphaform LF and Alphaform MF from Fluxtrol Inc., 1388 Atlantic Blvd. Auburn Hills, MI 48326 USA.

The materials Fluxtrol 100, Fluxtrol A, Fluxtrol 50 include electrically insulated iron particles and organic binder. They are suitable for different frequency ranges. While Fluxtrol 100 and Fluxtrol A are particularly suitable for frequencies up to 50 kilo-Hertz, Fluxtrol 50 is suitable or frequencies between 10 kilo-Hertz and 1000 kilo-Hertz. All three materials are characterized by a good mechanical strength, machinability and thermal conductivity.

Ferrotron 559H includes electrically insulated iron particles and organic binder, but includes more binder by volume than the aforementioned Fluxtrol materials. Ferrotron 559H is suitable for middle-to-high frequencies between 10 kilo-Hertz and 3000 kilo-Hertz material.

Alphaform LF and Alphaform MF are formable soft magnetic composites developed on the basis of magnetic particles with a thermal-curing epoxy binder. Alphaform LF is suitable or frequencies between 1 kilo-Hertz and 80 kilo-Hertz, whereas Alphaform MF is suitable or frequencies between 10 kilo-Hertz and 1000 kilo-Hertz.

Alternatively or in addition, the insulating conductor encasement, in particular the flux concentrator material may comprise at least one of a mu-metal or a permalloy. A mu-metal is a nickel-iron soft ferromagnetic alloy with very high magnetic permeability, in particular of about 80000 to 100000. For example, the mu-metal may comprise approximately 77 weight percent nickel, 16 weight percent iron, 5 weight percent copper, and 2 weight percent chromium or molybdenum. Likewise, the mu-metal may comprise 80 weight percent nickel, 5 weight percent molybdenum, small amounts of various other elements, such as silicon, and the remaining 12 to 15 weight percent iron. Permalloys are nickel-iron magnetic alloys, which typically contain additional elements such as molybdenum, copper and/or chromium.

To increase the magnetic flux between the insulating conductor encasements of adjacent turns of the induction coil, the plurality of turns preferably are in physical contact with each other, that is, the plurality of turns preferably abut each other. In particular, the plurality of turns preferably may be in physical contact with each other such that at least the insulating conductor encasements of adjacent turns are in contact with each other, that is, abut each other. However, it is also possible that there is a small gap between adjacent turns of the induction coil. The gap may be at most 0.75 millimeter, in particular at most 0.5 millimeter, preferably at most 0.25 millimeter.

Although the conductor encasement may comprise metallic materials and thus electrically conductive materials, the conductor encasement as a whole is still electrically insulting, that is, electrically non-conductive in order to prevent a short circuit between adjacent turns of the induction coil.

According to a specific aspect of the invention, the composite cable may be a multi-layer composite cable comprising an electrically insulating conductor encasement layer forming the insulating conductor encasement, and further comprising at least one of a support layer, a flux concentrator layer or a shield layer. A layered configuration of the composite cable allows for combining several functionalities in one cable and in particular for implementing these functionalities in one step. Advantageously, this reduces the effort required to manufacture the aerosol-generating device both in terms of costs and time.

The support layer primarily serves to increase the mechanical resistance of the composite cable. Preferably, the support layer does not affect the induction performance of the magnetic field generated by the current through the electrical conductor. That is, the support layer preferably is electromagnetically inert. Accordingly, the support layer preferably comprises an electromagnetic inert material, in particular at least one of polyetheretherketone or polyaryletherketone.

The support layer may have a layer thickness in a range between 0.1 millimeter and 1 millimeter, in particular between 0.2 millimeter and 0.5 millimeter, or in range between 0.25 millimeter and 1 millimeter, in particular between 0.25 millimeter and 0.5 millimeter. On the one hand, these thicknesses are large enough to ensure a sufficient mechanical resistance. On the other hand, these thicknesses are still small enough to keep the radial extension of the coil winding as small as possible in order to make optimum use of the limited installation space in such devices.

The support layer preferably is arranged on a side of the insulating conductor encasement layer facing inwards towards the cavity when the composite cable is arranged around the cavity.

The electrical conductor may be partially embedded in the support layer. That is, the support layer may cover at least portion the electrical conductor. In particular, the support layer may cover at least a side of the electrical conductor facing inwards towards the cavity when the composite cable is arranged around the cavity.

Even more preferably, the support layer is an edge layer, in particular an edge layer forming the first side of the composite cable.

The flux concentrator layer is configured to act as a magnetic flux concentrator that is able to distort the magnetic field and, thus, to concentrate and guide the magnetic field generated by the induction coil within the cavity, as described above with regard to the magnetic flux concentrator material optionally comprised in the insulting conductor encasement. To this extent, the flux concentrator layer may be preferably provided instead of a magnetic flux concentrator material comprised in the insulting conductor encasement. Advantageously, this may help to avoid possible issues when using electrically conductive flux concentrator materials, such as metallic flux concentrator materials, in the conductor encasement which is supposed to be electrically insulating as a whole in order to prevent a short circuit between adjacent turns of the induction coil. However, it is also possible that the insulating conductor encasement layer also comprises a flux concentrator material in addition to a flux concentrator layer.

To act as a magnetic flux concentrator, the flux concentrator layer may comprise a magnetic flux concentrator material, in particular any one of the magnetic flux concentrator materials described above with regard to the insulting conductor encasement. Details of these materials have been described there and equally apply to the flux concentrator layer.

The flux concentrator layer preferably is arranged on a side of the insulating conductor encasement layer facing outwards away from the cavity when the composite cable is arranged around the cavity.

The shield layer may serve to reduce adverse effects of the magnetic field in regions outside the shield layer and, vice versa, to reduce distortion of the magnetic field by electrically conductive or highly magnetically susceptible materials in the immediate vicinity of the device, or in the housing of the device itself.

For this, the shield layer may comprise an electrically conductive material, such as a metal. In particular, the shield layer may comprise at last one of aluminium, copper, tin, steel, gold, silver, an electrically conductive polymer, a ferrite or any combination thereof. For example, the shield layer may be a metal coating applied on a side of the electrically insulating conductor encasement layer facing outwards away from the cavity, when the composite cable is arranged around the cavity. The metal coating may be applied in any suitable manner, for example as a metal paint, a metal ink, or by a vapor deposition process.

The shield layer preferably is arranged on a side of the insulating conductor encasement layer facing outwards away from the cavity when the composite cable is arranged around the cavity. Preferably, the shield layer may be an edge layer, in particular an edge layer forming the second side of the composite cable.

If the multi-layer composite cable comprises both, a flux concentrator layer and a shield layer, the flux concentrator layer preferably is arranged on top of the electrically insulating conductor encasement layer (preferably on a side of the insulating conductor encasement layer facing outwards away from the cavity when the composite cable is arranged around the cavity), and the shield layer is arranged on top of the flux concentrator layer, preferably such as to be an edge layer, in particular an edge layer forming the second side of the composite cable.

In order to improve the shielding effect, the induction coil may be additionally surrounded by a tube, a sleeve, a tape or a foil, that is electrically conductive. Preferably, the surrounding cube, sleeve, tape or foil is in physical contact with the shield layer of each turn of the induction coil.

The shield layer may have a layer thickness in a range between 0.3 millimeter and 3 millimeter, in particular between 0.3 millimeter and 2 millimeter, or in range between 0.25 millimeter and 5.5 millimeter, in particular between 0.25 millimeter and 1.75 millimeter. These thicknesses are well suited to keep the radial extension of the coil winding as small as possible, but to still allow for a sufficient shielding effect.

Likewise, the flux concentrator layer may have a layer in a range between 0.3 millimeter and 3 millimeter, in particular between 0.3 millimeter and 2 millimeter, or in range between 0.25 millimeter and 5.5 millimeter, in particular between 0.25 millimeter and 1.75 millimeter.

The insulating conductor encasement layer may have a layer thickness in a range between 0.2 millimeter and 6 millimeter, in particular between 0.4 millimeter and 2 millimeter, or in range between 0.15 millimeter and 3 millimeter, in particular between 0.3 millimeter and 1 millimeter, or in range between 0.25 millimeter and 3 millimeter, in particular between 0.3 millimeter and 1.5 millimeter, or in a range between 0.5 millimeter and 7 millimeter, in particular between 0.7 millimeter and 4 millimeter or between 0.7 millimeter and 3 millimeter, or in a range between 0.4 millimeter and 9.2 millimeter, in particular between 0.45 millimeter and 3.1 millimeter, or in a range between 0.4 millimeter and 7.2 millimeter, in particular between 0.45 millimeter and 2.6 millimeter, or in a range between 0.45 millimeter and 3.7 millimeter, in particular between 0.5 millimeter and 2.85 millimeter.

A portion of the insulating conductor encasement layer embedding the conductor on a side opposite to the first side may have a thickness in a range between 0.2 millimeter and 7 millimeter, in particular between 0.2 millimeter and 2 millimeter, or in range between 0.25 millimeter and 1.5 millimeter, in particular between 0.25 millimeter and 0.75 millimeter, or in a range between 0.2 millimeter and 5 millimeter, in particular 0.2 millimeter and 1.5 millimeter. These thicknesses are particularly suitable to ensure a sufficient flux concentration of the magnetic field in case the insulating conductor encasement comprises a flux concentrating material.

The conductor may be completely embedded in the insulating conductor encasement. Alternatively, the conductor may be partially embedded in the insulating conductor encasement, in particular in the insulating conductor encasement layer, and partially in the support layer such as to completely be surrounded by the insulating conductor encasement, in particular the insulating conductor encasement layer, and the support layer.

The aerosol-generating device may further comprise at least one susceptor which is part of the device. Alternatively, the at least one susceptor may be integral part of an aerosol-generating article which comprises the aerosol-forming substrate to be heated. As part of the device, the at least one susceptor is arranged or arrangeable at least partially within the cavity such as to be in thermal proximity to or thermal contact, preferably physical contact with the aerosol-forming substrate during use.

The susceptor may be formed from any material that can be inductively heated to a temperature sufficient to generate an aerosol from the aerosol-forming substrate. Preferred susceptors comprise a metal or carbon. A preferred susceptor may comprise a ferromagnetic material, for example ferritic iron, or a ferromagnetic steel or stainless steel. A suitable susceptor may be, or comprise, aluminum. Preferred susceptors may be formed from 400 series stainless steels, for example grade 410, or grade 420, or grade 430 stainless steel.

The susceptor may comprise a variety of geometrical configurations. The susceptor may comprise or may be a susceptor pin, a susceptor rod, a susceptor blade, a susceptor strip or a susceptor plate. Where the susceptor is part of the aerosol-generating device, the susceptor pin, susceptor pin, the susceptor rod, the susceptor blade, the susceptor strip or the susceptor plate may project into the cavity of the device, preferably towards an opening of the cavity that is used for inserting the aerosol-generating article into the cavity.

The susceptor may comprise or may be a filament susceptor, a mesh susceptor, a wick susceptor.

Likewise, the susceptor may comprise or may be susceptor sleeve, a susceptor cup, a cylindrical susceptor or a tubular susceptor. Preferably, the inner void of the susceptor sleeve, the susceptor cup, the cylindrical susceptor or the tubular susceptor is configured to removably receive at least a portion of the aerosol-generating article.

The aforementioned susceptors may have any cross-sectional shape, for example, circular, oval, square, rectangular, triangular or any other suitable shape.

In addition to the induction coil, the inductive heating arrangement may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the induction coil for generating an alternating electromagnetic field. The AC current may be supplied to the induction coil continuously following activation of the system or may be supplied intermittently, such as on a puff by puff basis.

Preferably, the inductive heating arrangement comprises a DC/AC converter connected to the DC power supply including an LC network, wherein the LC network comprises a series connection of a capacitor and the induction coil.

The inductive heating arrangement preferably is configured to generate a high-frequency electromagnetic field. As referred to herein, the high-frequency electromagnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the device. In particular, the controller may be configured to control operation of the inductive heating arrangement, preferably in a closed-loop configuration, for controlling heating of the aerosol-forming substrate to a pre-determined operating temperature. The operating temperature used for heating the aerosol-forming substrate may be at least 180 degree Celsius, in particular at least 300 degree Celsius, preferably at least 350 degree Celsius, more preferably at least 370 degree Celsius, most preferably at least 400 degree Celsius. These temperatures are typical operating temperatures for heating but not combusting the aerosol-forming substrate. Preferably, the operating temperature is in a range between 180 degree Celsius and 370 degree Celsius, in particular between 180 degree Celsius and 240 degree Celsius or between 280 degree Celsius and 370 degree Celsius. In general, the operating temperature may depend on at least one of the type of the aerosol-forming substrate to be heated, the configuration of the susceptor and the arrangement of the susceptor relative to the aerosol-forming substrate in use of the system. For example, in case the susceptor is configured and arranged such as to surround the aerosol-forming substrate in use of the system, the operating temperature may be in a range between 180 degree Celsius and 240 degree Celsius. Likewise, in case the susceptor is configured such as to be arranged within the aerosol-forming substrate in use of the system, the operating temperature may be in a range between 280 degree Celsius and 370 degree Celsius. The operating temperature as described above preferably refers to the temperature of the susceptor in use.

The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C, a Class-D or a Class-E power amplifier. In particular, the inductive heating arrangement may be part of the controller.

The aerosol-generating device may comprise a power supply, in particular a DC power supply configured to provide a DC supply voltage and a DC supply current to the inductive heating arrangement. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the inductive heating arrangement.

The aerosol-generating device may comprise a main body which preferably includes at least one of the inductive heating arrangement, in particular the at least one induction coil, the controller, the power supply and at least a portion of the cavity.

In addition to the main body, the aerosol-generating device may further comprise a mouthpiece, in particular in case the aerosol-generating article to be used with the device does not comprise a mouthpiece. The mouthpiece may be mounted to the main body of the device. The mouthpiece may be configured to close the cavity upon mounting the mouthpiece to the main body. For attaching the mouthpiece to the main body, a proximal end portion of the main body may comprise a magnetic or mechanical mount, for example, a bayonet mount or a snap-fit mount, which engages with a corresponding counterpart at a distal end portion of the mouthpiece. In case the device does not comprise a mouthpiece, an aerosol-generating article to be used with the aerosol-generating device may comprise a mouthpiece, for example a filter plug.

The aerosol-generating device may comprise at least one air outlet, for example, an air outlet in the mouthpiece (if present).

Preferably, the aerosol-generating device comprises an air path extending from the at least one air inlet through the cavity, and possibly further to an air outlet in the mouthpiece, if present. Preferably, the aerosol-generating device comprises at least one air inlet in fluid communication with the cavity. Accordingly, the aerosol-generating system may comprise an air path extending from the at least one air inlet into the cavity, and possibly further through the aerosol-forming substrate within the article and a mouthpiece into a user's mouth.

According to another aspect of the invention, the device may comprise an induction module defining at least a portion of the cavity. The induction coil may be arranged at an inner surface of the induction module. Alternatively, the induction coil may be arranged on at an outer surface of the induction module. In particular, the induction coil may be arranged in a recess, for example an annular recess, at the inner or outer surface of the induction module.

The induction module may be a sleeve-shaped induction module, in particular a cylindrical induction module such as to define a cylindrical cavity. Preferably, the induction module is arranged, in particular removably arranged within the device housing.

As to this, the present invention also provides an induction module arrangeable within an aerosol-generating device such as to form or being circumferentially arranged around at least a portion of a cavity of the device, wherein the cavity is configured for removably receiving an aerosol-forming substrate to be inductively heated. The induction module comprises at least one induction coil for generating an alternating electromagnetic field within the cavity in use, wherein the at least one induction coil is arranged around at least a portion of the cavity when the induction module is arranged in the device. The induction coil is formed by a plurality of turns of a composite cable arranged around at least a portion of the cavity, wherein the composite cable comprises an electrical conductor embedded at least partially in an insulating conductor encasement, and wherein the conductor comprises a plurality of non-insulated wires in electrical contact with each other.

Further features and advantages of the induction module, in particular of the induction coil and the composite cable, have been described with regard to the aerosol-generating device and will not be repeated.

According to the invention there is also provided an aerosol-generating system which comprises an aerosol-generating device according to the invention and as described herein. The system further comprises an aerosol-generating article for use with the device, wherein the article comprises an aerosol-forming substrate to be inductively heated by the device. The aerosol-generating article is received or receivable at least partially in the cavity of the device.

As mentioned before, the at least one susceptor used for inductively heating the aerosol-forming substrate may be integral part of the aerosol-generating article, instead of being of part of the aerosol-generating device. Accordingly, the aerosol-generating article may comprises at least one susceptor positioned in thermal proximity to or thermal contact with the aerosol-forming substrate such that in use the susceptor is inductively heatable by the inductive heating arrangement when the article is received in the cavity of the device.

Further features and advantages of the aerosol-generating system according to the invention have been described with regard to the aerosol-generating device and will not be repeated.

As used herein, the term "aerosol-generating device" generally refers to an electrically operated device that is capable of interacting with at least one aerosol-forming substrate, in particular with an aerosol-forming substrate provided within an aerosol-generating article, such as to generate an aerosol by heating the substrate. Preferably, the aerosol-generating device is a puffing device for generating an aerosol that is directly inhalable by a user thorough the user's mouth. In particular, the aerosol-generating device is a hand-held aerosol-generating device.

As used herein, the term "susceptor" refers to an element that is capable to convert electromagnetic energy into heat when subjected to an alternating magnetic field. This may be the result of hysteresis losses and/or eddy currents induced in the susceptor, depending on the electrical and magnetic properties of the susceptor material. Hysteresis losses occur in ferromagnetic or ferrimagnetic susceptors due to magnetic domains within the material being switched under the influence of an alternating electromagnetic field. Eddy currents may be induced if the susceptor is electrically conductive. In case of an electrically conductive ferromagnetic or ferrimagnetic susceptor, heat can be generated due to both, eddy currents and hysteresis losses.

As used herein, the term "aerosol-generating article" refers to an article comprising at least one aerosol-forming substrate that, when heated, releases volatile compounds that can form an aerosol. Preferably, the aerosol-generating article is a heated aerosol-generating article. That is, an aerosol-generating article which comprises at least one aerosol-forming substrate that is intended to be heated rather than combusted in order to release volatile compounds that can form an aerosol. The aerosol-generating article may be a consumable, in particular a consumable to be discarded after a single use. For example, the article may be a cartridge including a liquid aerosol-forming substrate to be heated.

Alternatively, the article may be a rod-shaped article, in particular a tobacco article, resembling conventional cigarettes. As stated above, the article may further comprise a susceptor positioned in thermal proximity to or thermal contact with the aerosol-forming substrate such that in use the susceptor is inductively heatable by the inductive heating arrangement when the article is received in the cavity of the device.

As used herein, the term “aerosol-forming substrate” denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid aerosol-forming substrate or a liquid aerosol-forming substrate or a gel-like aerosol-forming substrate, or any combination thereof. That is, the aerosol-forming substrate may comprise, for example, both solid and liquid components. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavorings. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

As used herein, the term “aerosol-generating system” refers to the combination of an aerosol-generating article as further described herein with an aerosol-generating device according to the invention and as described herein. In the system, the article and the device cooperate to generate a respirable aerosol.

Below, there is provided a non-exhaustive list of non-limiting examples. Any one or more of the features of these examples may be combined with any one or more features of another example, embodiment, or aspect described herein.

EXAMPLE 1

Aerosol-generating device for generating an aerosol by inductively heating an aerosol-forming substrate, the device comprising

- a device housing comprising a cavity configured for removably receiving at least a portion of the aerosol forming substrate to be heated;
- an inductive heating arrangement comprising an induction coil for generating an alternating magnetic field within the cavity, wherein the induction coil is formed by a plurality of turns of a composite cable arranged around at least a portion of the cavity, wherein the composite cable comprises an electrical conductor embedded at least partially in an insulating conductor encasement, and wherein the conductor comprises a plurality of non-insulated wires in electrical contact with each other.

EXAMPLE 2

Aerosol-generating device according to example 1, wherein the wires run parallel to each other along a length extension of the composite cable.

EXAMPLE 3

Aerosol-generating device according to any one of examples 1 or 2, wherein the wires run parallel to each other along a length extension of the composite cable in a single layer.

EXAMPLE 4

Aerosol-generating device according to any one of examples 1 or 2, wherein the wires run parallel to each other along a length extension of the composite cable in a plurality of layers on top of each other, in particular in two, three or four layers one on top of each other.

EXAMPLE 5

Aerosol-generating device according to any one of example 4, wherein at least a part of the wires of each layer is arranged in grooves formed between adjacent wires of an adjacent layer.

EXAMPLE 6

Aerosol-generating device according to any one of examples 3 to 5, wherein the single layer or each of the plurality of layers is a flat layer.

EXAMPLE 7

Aerosol-generating device according to any one of examples 3 to 5, wherein the single layer or each of the plurality of layers is a curved layer.

EXAMPLE 8

Aerosol-generating device according to any one of examples 3 to 7, wherein the single layer or each one of the plurality of layers is parallel to a circumferential plane defined by the plurality of turns of the composite cable.

EXAMPLE 9

Aerosol-generating device according to any one of the examples, wherein each wire of the plurality of wires has a circular outer cross-section or an elliptical outer cross-section or an oval outer cross-section or a rectangular outer cross-section or a square outer cross-section.

EXAMPLE 10

Aerosol-generating device according to any one of the preceding examples, wherein each wire of the plurality of wires has a diameter in a range between 0.2 millimeter and 2.3 millimeter, in particular between 0.25 millimeter and 1.2 millimeter, or in a range between 0.15 millimeter and 1.5 millimeter, in particular between 0.25 millimeter and 0.75 millimeter.

EXAMPLE 11

Aerosol-generating device according to any one of the preceding examples, wherein each wire of the plurality of wires has a cross-sectional area in a range between 0.1 square millimeter and 17 square millimeter, in particular between 0.2 square millimeter and 4.5 square millimeter, or in a range between 0.07 square millimeter and 7 square millimeter, in particular between 0.2 square millimeter and 1.8 square millimeter.

EXAMPLE 12

Aerosol-generating device according to any one of the preceding examples, wherein the composite cable is a flat composite cable.

EXAMPLE 13

Aerosol-generating device according to any one of the examples 1 to 12, wherein the composite cable has a circular cross-section.

EXAMPLE 14

Aerosol-generating device according to any one of the examples 1 to 12, wherein the composite cable has a non-circular outer cross-section, in particular a substantially rectangular outer cross-section or a substantially square outer cross-section or a substantially elliptical outer cross-section or a substantially oval outer cross-section or a substantially outer parallelogram-shaped cross-section or a substantially trapezoid outer cross-section or a substantially arc-shaped outer cross-section.

EXAMPLE 15

Aerosol-generating device according to any one of the preceding examples, wherein the composite cable—as being arranged around the cavity—comprises a first side facing inwards towards the cavity and a second side opposite to the first side facing outwards away from the cavity.

EXAMPLE 16

Aerosol-generating device according to any one of the preceding examples, wherein an outer cross-section, in particular a non-circular outer cross-section of the composite cable has a first axis of symmetry, in particular a first axis of symmetry extending between the first side and the second side or extending in a radial direction with respect to the plurality of turns of the composite cable.

EXAMPLE 17

Aerosol-generating device according to example 16, wherein an outer cross-section, in particular a non-circular outer cross-section of the composite cable has a second axis of symmetry transverse, in particular perpendicular to the first axis of symmetry.

EXAMPLE 18

Aerosol-generating device according to any one of the preceding examples, wherein a maximum dimension of the cross-section of the composite cable in a radial direction with respect to the plurality of turns of the composite cable, in particular a maximum dimension of the composite cable along an axis normal to the first side and to the second side, in particular a maximum thickness dimension of the cross-section of the composite cable, is in a range between 0.5 millimeter and 9 millimeter, in particular between 0.7 millimeter and 9 millimeter, preferably between 0.9 millimeter and 5 millimeter.

EXAMPLE 19

Aerosol-generating device according to any one of the preceding examples, wherein a maximum dimension of the cross-section of the composite cable perpendicular to a radial direction with respect to the plurality of turns of the composite cable, in particular a maximum dimension of the composite cable in a direction perpendicular to an axis normal to the first side and the second side or in a direction parallel to at least one of the first side and the second side, in particular a maximum width dimension of the cross-section of the composite cable, is in a range between 1 millimeter and 7 millimeter, in particular between 1.5 millimeter and 5 millimeter.

EXAMPLE 20

Aerosol-generating device according to any one of the examples 1 to 19, wherein the electrical conductor has a substantially circular outer cross-section.

EXAMPLE 21

Aerosol-generating device according to any one of the examples 1 to 19, wherein the electrical conductor has a non-circular outer cross-section, in particular a substantially rectangular outer cross-section or a substantially square outer cross-section or a substantially elliptical outer cross-section or a substantially oval outer cross-section or a substantially parallelogram-shaped outer cross-section or a substantially trapezoid outer cross-section or a substantially arc-shaped outer cross-section.

EXAMPLE 22

Aerosol-generating device according to any one of the preceding examples, wherein the electrical conductor is a flat the electrical conductor.

EXAMPLE 23

Aerosol-generating device according to any one of the preceding examples, wherein a maximum dimension of a cross-section of the electrical conductor in a radial direction with respect to the plurality of turns of the composite cable, in particular a maximum thickness dimension of the cross-section of the electrical conductor, in particular a maximum thickness dimension of the cross-section of the electrical conductor perpendicular to the first side, may be in a range between 0.2 millimeter and 2.3 millimeter, in particular between 0.25 millimeter and 1.2 millimeter.

EXAMPLE 24

Aerosol-generating device according to any one of the preceding examples, wherein a maximum dimension of the cross-section of the electrical conductor perpendicular to a radial direction with respect to the plurality of turns of the composite cable, in particular a maximum width dimension of the cross-section of the electrical conductor, in particular a maximum width dimension of the cross-section of the electrical conductor parallel to the first side, may be in a range between 0.75 millimeter and 6 millimeter, in particular between 1 millimeter and 4 millimeter.

EXAMPLE 25

Aerosol-generating device according to any one of the preceding examples, wherein the composite cable—as being arranged around the cavity—comprises a first side facing inwards towards the cavity and a second side opposite to the first side facing outwards away from the cavity, and wherein the conductor is arranged asymmetrically with regard to the outer cross-section of the composite cable such as to be closer to the first side than to the second side of the composite cable, in particular asymmetrically with regard to the second axis of symmetry of the outer cross-section of the composite cable extending transverse, in particular perpendicular to a radial direction with respect to the plurality of turns of the composite cable.

EXAMPLE 26

Aerosol-generating device according to any one of the preceding examples, wherein a minimum distance between the electrical conductor and the first side of the cable facing inwards towards the cavity is at most in a range between 0.1 millimeter and 0.5 millimeter, in particular between 0.1 millimeter and 0.3 millimeter, or in range between 0.1 millimeter and 1 millimeter, in particular between 0.2 millimeter and 0.5 millimeter.

EXAMPLE 27

Aerosol-generating device according to any one of the preceding examples, wherein the insulating conductor encasement comprises a magnetic flux concentrator material.

EXAMPLE 28

Aerosol-generating device according to example 27, wherein the flux concentrator material is held in a matrix.

EXAMPLE 29

Aerosol-generating device according to any one of the preceding examples, wherein the insulating conductor encasement, in particular the magnetic flux concentrator material, comprises at least one of a ferrimagnetic material or ferromagnetic material or a mu-metal or a permalloy.

EXAMPLE 30

Aerosol-generating device according to any one of the preceding examples, wherein the insulating conductor encasement, in particular the magnetic flux concentrator material, comprises a material or materials having a relative maximum magnetic permeability of at least 1000, preferably at least 10000 for frequencies up to 50 kHz and a temperature of 25 degrees Celsius.

EXAMPLE 31

Aerosol-generating device according to any one of the preceding examples, wherein the plurality of turns are in contact with each other, preferably abut each other.

EXAMPLE 32

Aerosol-generating device according to any one of the preceding examples, wherein the composite cable is a multi-layer composite cable comprising an electrically insulating conductor encasement layer forming the insulating conductor encasement, and further comprising at least one of a support layer, a flux concentrator layer or a shield layer.

EXAMPLE 33

Aerosol-generating device according to example 32, wherein the support layer comprises an electromagnetic inert material, in particular at least one of polyetheretherketone or polyaryletherketone.

EXAMPLE 34

Aerosol-generating device according to any one of example 32 or 33, wherein the support layer has a layer thickness in a range between 0.1 millimeter and 1 millimeter, in particular between 0.2 millimeter and 0.5 millimeter, or in range between 0.25 millimeter and 1 millimeter, in particular between 0.25 millimeter and 0.5 millimeter.

EXAMPLE 35

Aerosol-generating device according to any one of examples 32 to 34, wherein the conductor is partially embedded in the support layer.

EXAMPLE 36

Aerosol-generating device according to any one of examples 32 to 35, wherein the support layer is an edge layer, in particular an edge layer forming the first side of the composite cable.

EXAMPLE 37

Aerosol-generating device according to any one of examples 32 to 36, wherein the shield layer comprises an electrically conductive material, in particular at last one of aluminium, copper, tin, steel, gold, silver, an electrically conductive polymer, a ferrite or any combination thereof.

EXAMPLE 38

Aerosol-generating device according to any one of examples 32 to 37, wherein the shield layer is an edge layer, in particular an edge layer forming the second side of the composite cable.

EXAMPLE 39

Aerosol-generating device according to any one of examples 32 to 38, wherein the shield layer has a layer thickness in a range between 0.3 millimeter and 3 millimeter, in particular between 0.3 millimeter and 2 millimeter, or in range between 0.25 millimeter and 5.5 millimeter, in particular between 0.25 millimeter and 1.75 millimeter.

EXAMPLE 40

Aerosol-generating device according to any one of examples 32 to 39, wherein the flux concentrator layer comprises a magnetic flux concentrator material.

EXAMPLE 41

Aerosol-generating device according to example 40, wherein the flux concentrator material is held in a matrix.

EXAMPLE 42

Aerosol-generating device according to any one of examples 32 to 41, wherein the flux concentrator layer, in particular the magnetic flux concentrator material of the flux concentrator layer, comprises at least one of a ferrimagnetic material or ferromagnetic material or a mu-metal or a permalloy.

EXAMPLE 43

Aerosol-generating device according to any one of examples 32 to 42, wherein the flux concentrator layer, in particular the magnetic flux concentrator material of the flux concentrator layer, comprises a material or materials having a relative maximum magnetic permeability of at least 1000, preferably at least 10000 for frequencies up to 50 kHz and a temperature of 25 degrees Celsius.

EXAMPLE 44

Aerosol-generating device according to any one of examples 32 to 43 wherein the electrically insulating conductor encasement layer is free of a magnetic flux concentrator material.

EXAMPLE 45

Aerosol-generating device according to any one of examples 32 to 44, wherein the support layer is arranged on a side of the insulating conductor encasement when the composite cable is arranged around the cavity.

EXAMPLE 46

Aerosol-generating device according to any one of examples 32 to 45, wherein the flux concentrator layer is arranged on a side of the insulating conductor encasement layer facing outwards away from the cavity when the composite cable is arranged around the cavity.

EXAMPLE 47

Aerosol-generating device according to any one of examples 32 to 46, wherein the shield layer is arranged on a side of the insulating conductor encasement layer facing outwards away from the cavity when the composite cable is arranged around the cavity.

EXAMPLE 48

Aerosol-generating device according to any one of examples 32 to 47, wherein the multi-layer composite cable comprises both, a flux concentrator layer and a shield layer, wherein the flux concentrator layer is arranged on top of the electrically insulating conductor encasement layer, preferably on a side of the insulating conductor encasement layer facing outwards away from the cavity when the composite cable is arranged around the cavity, and wherein the shield layer is arranged on top of the flux concentrator layer, preferably being an edge layer, in particular an edge layer forming the second side of the composite cable.

EXAMPLE 49

Aerosol-generating device according to any one of examples 32 to 48, wherein the insulating conductor encasement layer has a layer thickness in a range between 0.2 millimeter and 6 millimeter, in particular between 0.4 millimeter and 2 millimeter, or in range between 0.15 millimeter and 3 millimeter, in particular between 0.3 millimeter and 1 millimeter, or in range between 0.25 millimeter and 3 millimeter, in particular between 0.3 millimeter and 1.5 millimeter, or in a range between 0.5 millimeter and 7 millimeter, in particular between 0.7 millimeter and 4 millimeter or between 0.7 millimeter and 3 millimeter, or in a range between 0.4 millimeter and 9.2 millimeter, in particular between 0.45 millimeter and 3.1 millimeter, or in a range between 0.4 millimeter and 7.2 millimeter, in particular between 0.45 millimeter and 2.6 millimeter, or in a range between 0.45 millimeter and 3.7 millimeter, in particular between 0.5 millimeter and 2.85 millimeter.

EXAMPLE 50

Aerosol-generating device according to any one of examples 32 to 49, wherein a portion of the insulating conductor encasement layer embedding the conductor at a side opposite to the first side has a thickness in a range between 0.2 millimeter and 7 millimeter, in particular between 0.2 millimeter and 2 millimeter, or in range between 0.25 millimeter and 1.5 millimeter, in particular between 0.25 millimeter and 0.75 millimeter, or in a range between 0.2 millimeter and 5 millimeter, in particular 0.2 millimeter and 1.5 millimeter.

EXAMPLE 51

Aerosol-generating device according to any one of the preceding examples, wherein the conductor is completely embedded in the insulating conductor encasement.

EXAMPLE 52

Aerosol-generating device according to any one of the preceding examples, wherein the device comprises a induction module defining at least a portion the cavity, wherein the induction coil is arranged on an inner surface of the induction module or at an outer surface of the sleeve-shaped induction module.

EXAMPLE 53

Aerosol-generating device according to example 52, wherein the induction module is a sleeve-shaped induction module, in particular a cylindrical induction module such as to define a cylindrical cavity.

EXAMPLE 54

Aerosol-generating device according to any one of example 52 or 53, wherein the induction module is arranged, in particular removably arranged within the device housing.

EXAMPLE 55

Aerosol-generating device according to any one of the preceding examples, further comprising at least one susceptor arranged at least partially within the cavity.

EXAMPLE 56

Aerosol-generating device according to example 46, wherein the susceptor is a tubular susceptor or a susceptor sleeve.

EXAMPLE 57

Aerosol-generating system comprising an aerosol-generating device according to any one of the preceding examples and an aerosol-generating article received or receivable at least partially in the cavity of the device, wherein the aerosol-generating article comprises the aerosol-forming substrate to be heated.

EXAMPLE 58

Aerosol-generating system according to example 57, wherein the aerosol-generating article comprises at least one susceptor positioned in thermal proximity to or thermal contact with the aerosol-forming substrate such that in use the susceptor is inductively heatable by the inductive heating arrangement when the article is received in the cavity of the device.

Examples will now be further described with reference to the figures in which.

Figure 1:
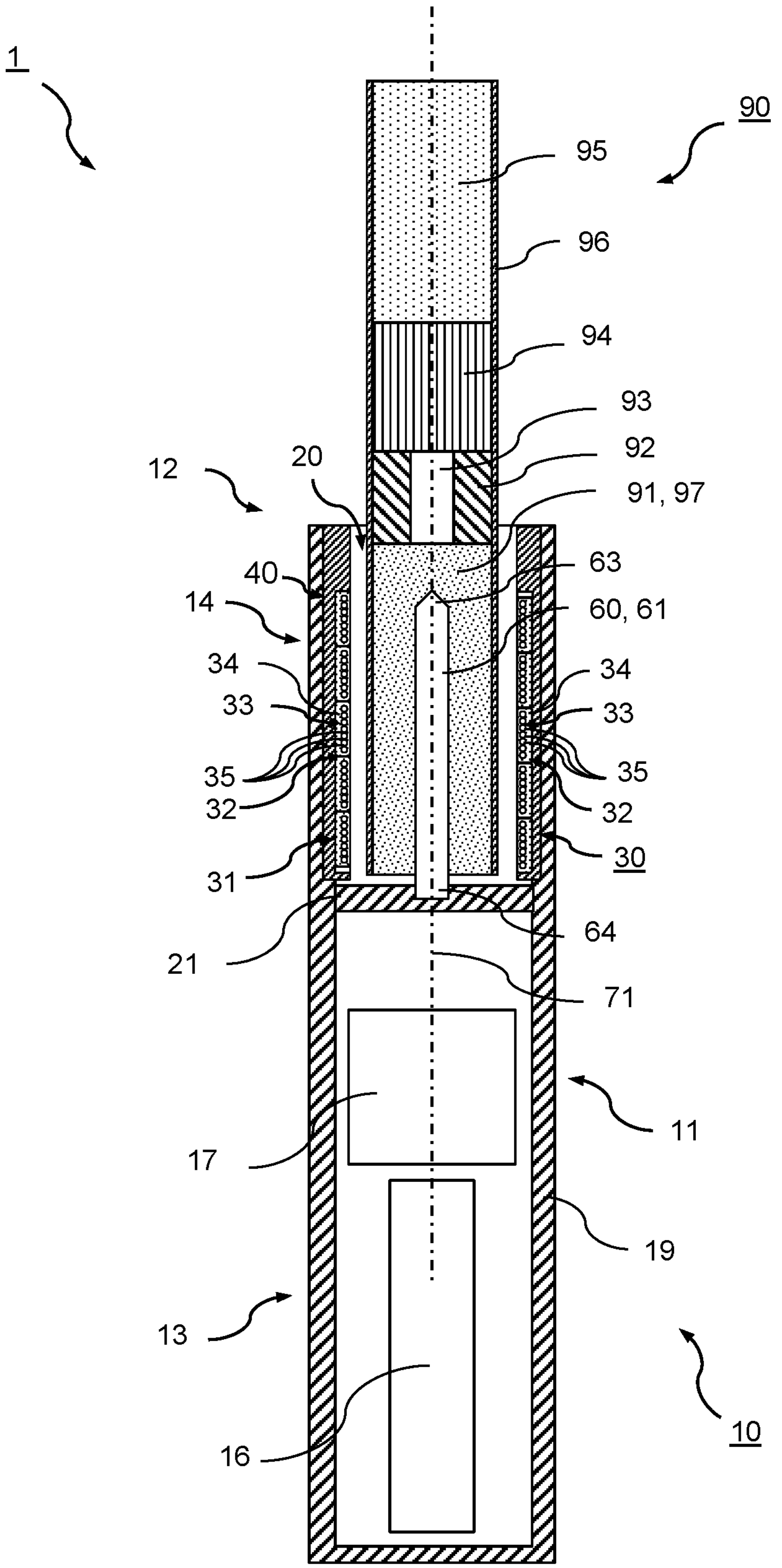
FIG. 1 shows a schematic longitudinal cross-section of an aerosol-generating system in accordance with a first embodiment the present invention.

FIG. 1 shows a schematic cross-sectional illustration of a first exemplary embodiment of an aerosol-generating system 1 according to the present invention. The system 1 is configured for generating an aerosol by inductively heating an aerosol-forming substrate 97. The system 1 comprises two main components: an aerosol-generating article 90 including the aerosol-forming substrate 97 to be heated, and an aerosol-generating device 10 for use with the article 90. The device 10 comprises a cavity 20 for receiving the article 90, and an inductive heating arrangement 30 for heating the substrate 97 within the article 90 when the article 90 is received in the cavity 20.

The article 90 has a rod shape resembling the shape of a conventional cigarette. In the present embodiment, the article 90 comprises four elements arranged in coaxial alignment: a substrate element 91, a support element 92, an aerosol-cooling element 94, and a filter plug 95. The substrate element is arranged at a distal end of the article 90 and comprises the aerosol-forming substrate to be heated. The aerosol-forming substrate 97 may include, for example, a crimped sheet of homogenized tobacco material including glycerin as an aerosol-former. The support element 92 comprises a hollow core forming a central air passage 93. The filter plug 95 serves as a mouthpiece and may include, for example, cellulose acetate fibers. All four elements are substantially cylindrical elements being arranged sequentially one after the other. The elements have substantially the same diameter and are circumscribed by an outer wrapper 96 made of cigarette paper such as to form a cylindrical rod. The outer wrapper 96 may be wrapped around the aforementioned elements so that free ends of the wrapper overlap each other. The wrapper may further comprise adhesive that adheres the overlapped free ends of the wrapper to each other.

The device 10 comprises a substantially rod-shaped main body 11 formed by a substantially cylindrical device housing 19. Within a distal portion 13, the device 10 comprises a power supply 16, for example a lithium ion battery, and an electric circuitry 17 including a controller for controlling operation of the device 10, in particular for controlling the heating process. Within a proximal portion 14 opposite to the distal portion 13, the device 10 comprises the cavity 20. The cavity 20 is open at the proximal end 12 of device 10, thus allowing the article 90 to be inserted into the cavity 20.

A bottom portion 21 of the cavity separates the distal portion 13 of the device 10 from the proximal portion 14, in particular from the cavity 20. Preferably, the bottom portion is made of a thermally insulating material, for example, PEEK (polyether ether ketone). Thus, electric components within the distal portion 13 may be kept separate from aerosol or residues produced by the aerosol generating process within the cavity 20.

The inductive heating arrangement 30 comprises an induction coil 31 for generating an alternating, in particular high-frequency magnetic field within the cavity 20. Preferably, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz). In the present embodiment, the induction coil 31 is a helical coil circumferentially surrounding the cylindrical cavity 20 along its length axis. The induction coil 31 is formed by a plurality of turns of a composite cable 32 which comprises a multi-wire electrical conductor 33. Details of the composite cable 32 will be described further below, in particular with reference to FIG. 3-18.

The inductive heating arrangement 30 further comprises a susceptor 60 that is arranged within the cavity 20 such as to experience the magnetic field generated by the induction coil 31. In the present embodiment, the susceptor 60 is a susceptor blade 61. With its distal end 64, the susceptor blade is arranged at the bottom portion 21 of the cavity 20 of the device. From there, the susceptor blade 61 extends into the inner void of the cavity 20 towards the opening of the cavity 20 at the proximal end 12 of the device 10. The other end of the susceptor blade 60, that is, the distal free end 63 is tapered such as to allow the susceptor blade to readily penetrate the aerosol-forming substrate 97 within the distal end portion of the article 90.

Figure 2:
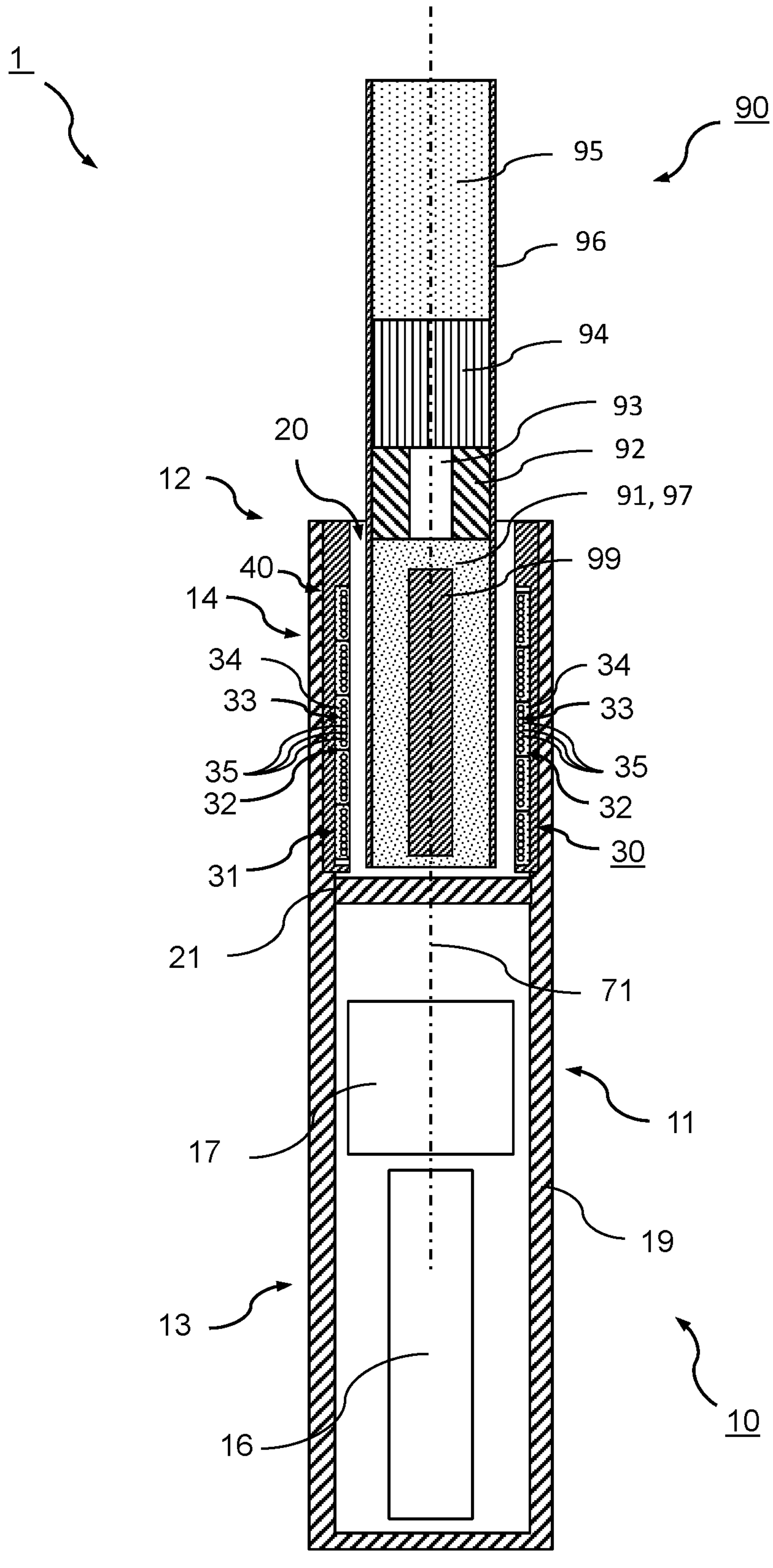
FIG. 2 shows a schematic longitudinal cross-section of an aerosol-generating system in accordance with a second embodiment the present invention.

Alternatively, as shown in FIG. 2, the susceptor 60 may be part of the aerosol-generating article 90. Here, the susceptor 99 is a susceptor strip made of a susceptive material that is embedded within the aerosol-forming substrate 97 of the article 90. The susceptor strip 99 is arranged such as to extend long the center of the substantially cylindrical article 90. Apart from that, the embodiment of the aerosol-generating system according to FIG. 2 is identical to the embodiment of the aerosol-generating system according to FIG. 1. Therefore, identical or similar features are denoted with identical reference numbers.

With reference to both embodiments, the inductive heating process is as follows: When the device 10 is actuated, a high-frequency alternating current is passed through the induction coil 31. Since the coil is arranged around the cavity 20, the alternating current through the coil causes an alternating magnetic field within the cavity 20. Depending on the magnetic and electric properties of the respective susceptor material, the alternating magnetic field induces at least one of eddy currents or hysteresis losses in the susceptor blade 61 or the susceptor strip 99, respectively. As a consequence, the susceptor blade 61 or the susceptor strip 99, respectively, is heated up until reaching a temperature that is sufficient to form an aerosol from the substrate 97 that is in thermal proximity or direct physical contact thereto. The generated aerosol may be drawn downstream through the aerosol-generating article 90 for inhalation by the user.

As can be seen in FIG. 1 and FIG. 2, the induction coil 31 is part of an induction module 40 that is arranged with the proximal portion 14 of the aerosol-generating device 10. The induction module 40 has a substantially cylindrical shape that is coaxially aligned with a longitudinal center axis 71 of the rod-shaped device 10. As can be seen from FIG. 1, the induction module 40 forms a least a portion of the cavity 20 or at least a portion of an inner surface of the cavity 20.

Figure 3:
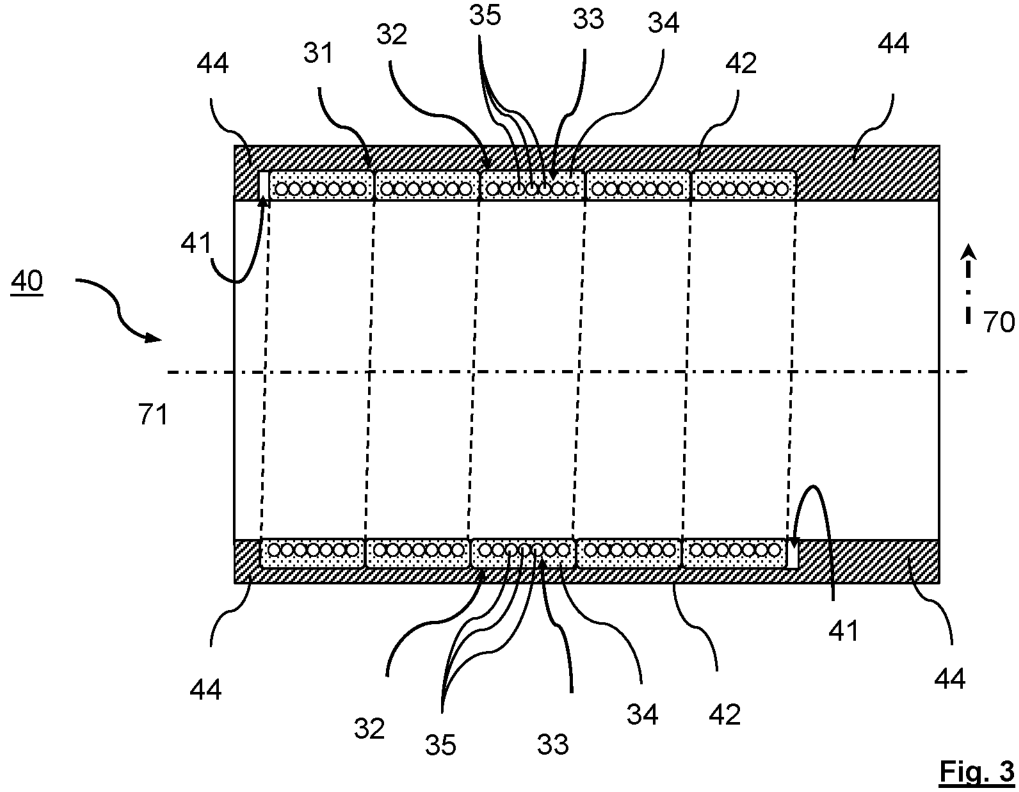
FIG. 3 shows a first embodiment of an induction module as used in the aerosol-generating system according to FIG. 1.

FIG. 3 shows the induction module 40 in more detail. Besides the induction coil 31, the induction module 40 comprises a tubular support sleeve 42 which carries the helically wound, cylindrical induction coil 31. At its inner surface, the tubular support sleeve 42 comprises an annular recess 41 in which the cylindrical induction coil 31 is received. Accordingly, both end portions 44 of the support sleeve 42 protrude radially inwards towards the center axis 71 such as to retain the induction coil 31 in position in the recess of the support sleeve 42. The support sleeve 42 may be made from any suitable material, such as a plastic. In particular, the support sleeve 42 may form a least a portion of the cavity 20, that is, at least a portion of an inner surface of the cavity 20.

Figure 4:
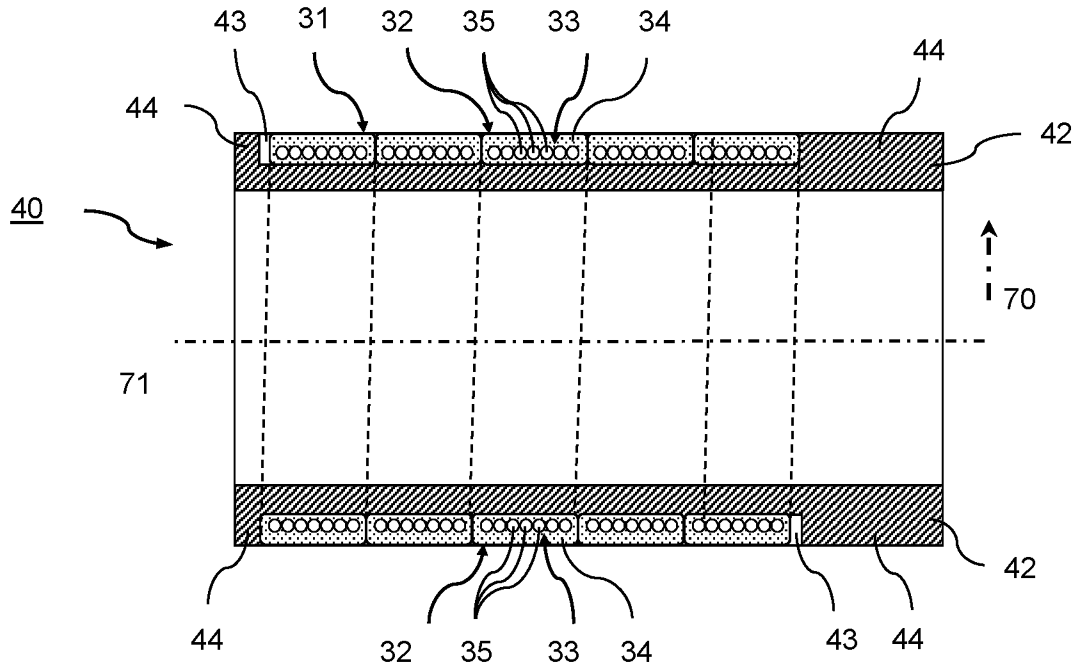
FIG. 4 shows a second embodiment of an induction module useable in an aerosol-generating system according to the present invention.

FIG. 4 shows a second embodiment of the induction module 40. Here, the tubular support sleeve 42 comprises an annular recess 43 at its outer surface in order to receive the cylindrical induction coil 31 therein. Accordingly, both end portions 44 of the support sleeve 42 protrude radially outwards away from the center axis 71 such as to retain the induction coil 31 in position in the recess 43.

Figure 5:
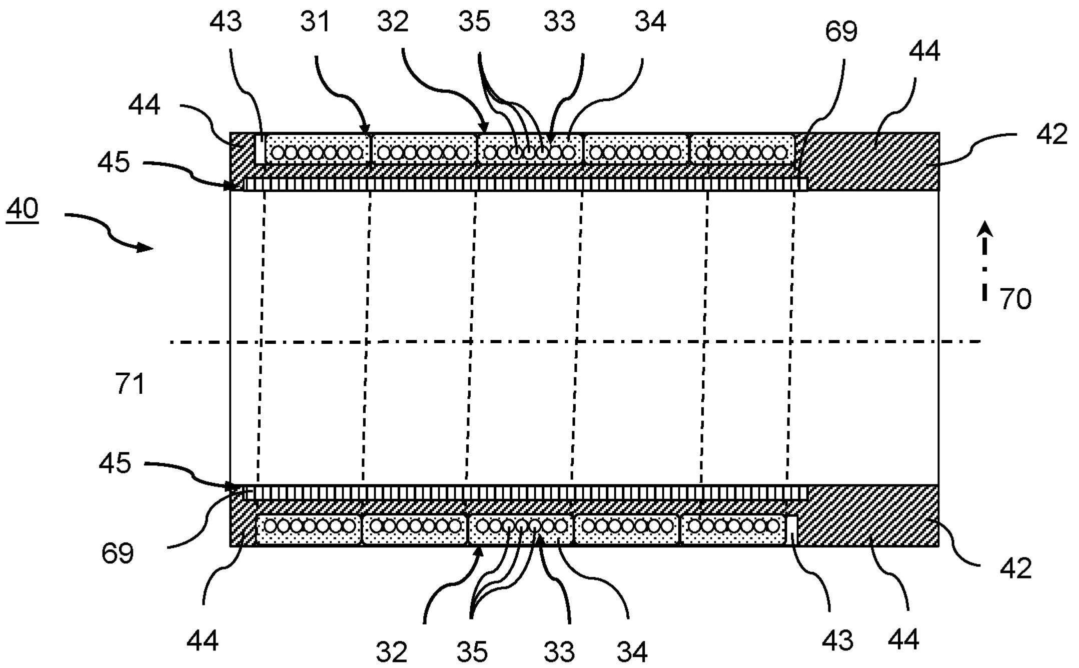
FIG. 5 shows a third embodiment of an induction module useable in an aerosol-generating system according to the present invention.

FIG. 5 shows a third embodiment of the induction module 40. The induction module 40 is nearly identical to the module according to FIG. 4. In addition, the induction module 40 of the third embodiment comprises a susceptor sleeve 69 42 that is surrounded by the induction coil 32. That is, the susceptor sleeve 69 is part of the aerosol-generating device but not of the aerosol-generating article. The susceptor sleeve 69 is arranged in an annular recess 45 at the inner surface of the support sleeve. Hence, the susceptor sleeve 69 forms at least a portion of an inner surface of the cavity 20. Accordingly, when an article is inserted in the cavity, the susceptor sleeve 69 surrounds the substrate element 91 in order to heat the aerosol-forming substrate from outside. In this configuration, the susceptor sleeve 69 acts an oven heater. This is in contrast to the embodiments shown in FIG. 1 and FIG. 2 where the susceptor blade 61 or the susceptor strip 99, respectively, heats the aerosol-forming substrate from inside.

Figure 6:
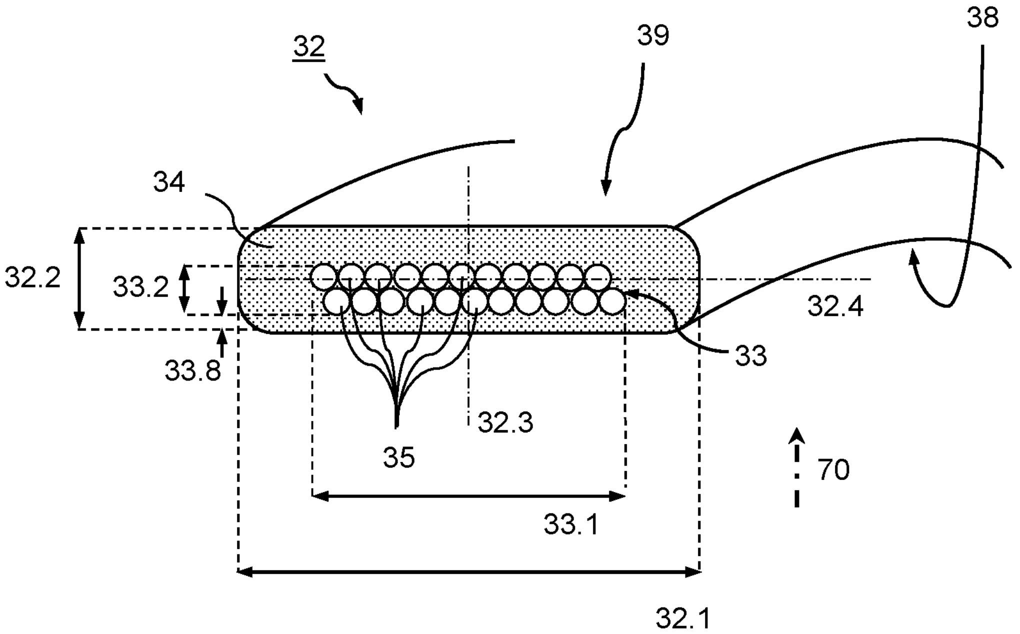
FIG. 6 shows a first embodiment of a composite cable as used in the aerosol-generating system according to FIG. 1.

FIG. 6 shows the composite cable 32 used to form the induction coil 31 of the devices 10 shown in FIG. 1 and FIG. 2 in more detail. The composite cable 32 comprises an electrical conductor 33 for carrying the current used to generate the magnetic field. The conductor 33 is fully embedded in an insulating conductor encasement 34 in order to electrically insulate adjacent turns of the induction coil from each other and thus to prevent a short circuit. According to the invention, the conductor 33 comprises a plurality of non-insulated wires 35 in electrical contact with each other. In the present embodiment, the conductor 33 comprises in total twenty-two wires 35 which are arranged in two layers on top of each other, wherein each layer comprises eleven wires 35. The layers are aligned such that wires 35 of one layer are arranged in grooves formed between adjacent wires 35 of the other layer. Accordingly, the assembly of all the wires 35 forms an electrical conductor 33 having a substantially trapezoid cross-section.

Each wire 35 may have a diameter in a range between 0.25 millimeter and 0.75 millimeter, for example 0.5 millimeter. Accordingly, the width dimension 33.1 of the electrical conductor 33 is given by eleven-and-half times the wire diameter. That is, the width dimension 33.1 of the electrical conductor 33 may be in range between 2.875 millimeter and 8.625 millimeter, for example 5.75 millimeter. Likewise, the thickness dimension 33.2 of the electrical conductor 33 is given by about 1.73 times the wire diameter. That is, the width dimension 33.1 of the electrical conductor 33 may be in range between about 0.4 millimeter and about 1.3 millimeter, for example about 6.5 millimeter. In the present embodiment, the width dimension of the electrical conductor 33 corresponds to a maximum dimension of the cross-section of the electrical conductor perpendicular to a radial direction 70 (see dashed-dotted arrow in FIG. 4-6) with respect to the plurality of turns of the composite cable. Likewise, the thickness dimension of the electrical conductor 33 corresponds to a maximum dimension of a cross-section of the electrical conductor 33 in a radial direction 70 (see dashed-dotted arrow in FIG. 4-6) with respect to the plurality of turns of the composite cable 32. As the width dimension 33.1 of the electrical conductor 33 is much larger than its thickness dimension 33.2, the electrical conductor 33 may be denoted as a flat electrical conductor 33.

The same holds for the entire cable 32 which also has a width dimension 32.1 that is much larger than its thickness dimension 32.2. Accordingly, the composite cable 32 may be denoted as a flat composite cable 32. In the present embodiment, the width dimension 32.1 of the composite cable 32, that is, a maximum dimension of the cross-section of the composite cable 32 perpendicular to a radial direction 70 (see dashed-dotted arrow in FIG. 4-6) with respect to the plurality of turns of the composite cable 32 31, may be in a range between 1 millimeter and 7 millimeter, in particular between 1.5 millimeter and 5 millimeter. Likewise, the thickness dimension 32.2 of the composite cable 32, that is, wherein a maximum dimension of the cross-section of the composite cable 32 in a radial direction 70 (see dashed-dotted arrow in FIG. 4-6) with respect to the plurality of turns of the composite cable, may be in a range between 0.5 millimeter and 9 millimeter, in particular between 0.7 millimeter and 9 millimeter, preferably between 0.9 millimeter and 5 millimeter. The outer cross-section of the composite cable 32 is substantially rectangular which rounded edges.

Upon being arranged around the cavity 20, the composite cable 32 comprises a first side 38 facing inwards towards the cavity 20 and a second side 39 opposite to the first side facing outwards away from the cavity 20. This is indicated in FIG. 6 which shows a section of the composite cable in the winding configuration.

As can be further seen in FIG. 6, the electrical conductor 33 is arranged substantially symmetrically with respect to a first axis of symmetry 32.3 of the outer cross-section of the cable 32 which extends between the first side 38 and the second side 39 in the radial direction 70. In contrast, the electrical conductor 33 is arranged asymmetrically with regard to a second axis of symmetry 32.4 of the outer cross-section of the composite cable 32 such as to be closer to the first side 38 of the composite cable than to the second side 39. That is, the insulating conductor encasement 34 is mainly located towards the second side 39 of the composite cable and thus radially further outside than the electrical conductor 33. In particular, the electrical conductor 33 is arranged between the first side 38 and the second axis of symmetry. Due to this, the insulating conductor encasement 34 may act as a protective sheath surrounding the conductor 33 when the composite cable 32 is arranged around the cavity. Here, a minimum distance 33.8 between the conductor 33 and the first side 38 is at most in a range between 0.1 millimeter and 0.5 millimeter, in particular between 0.1 millimeter and 0.3 millimeter.

In addition, the insulating conductor encasement 34 may serve other purposes. In the present embodiment, the insulating conductor encasement 34 comprises a magnetic flux concentrator material in order to concentrate or focus the magnetic field within the cavity 20. Advantageously, this increases the level of heat generated in the susceptor for a given level of power passing through the induction coil 31 in comparison to induction coils having no flux concentrator. Thus, the efficiency of the aerosol-generating device 10 is improved. Furthermore, by distorting the magnetic field towards the cavity, the magnetic flux concentrator material of the insulating conductor encasement 34 reduces the extent to which the magnetic field propagates beyond the induction coil 31. That is, the flux concentrator material of the insulating conductor encasement 34 acts as a magnetic shield. Advantageously, this may reduce undesired interference of the magnetic field with other susceptive parts of the aerosol-generating device 10, for example with a metallic outer housing, or with susceptive external items in close proximity to the device 10. In particular, integrating a magnetic flux concentrator material in the composite cable 32 allows for providing both the induction coil 31 and an appropriate magnetic flux concentrator in one part. Advantageously, this reduces the effort required to manufacture the aerosol-generating device 10 both in terms of costs and time. As an example, the insulating conductor encasement 34 may comprise or may be made of a lamination, a pure ferrite or a proprietary iron- or ferrite based composition. Here, the insulating conductor encasement 34 is made of Alphaform MF available from Fluxtrol Inc., 1388 Atlantic Blvd. Auburn Hills, MI 48326 USA. Alphaform MF is formable soft magnetic composite developed on the basis of magnetic particles with a thermal-curing epoxy binder which is suitable or frequencies between 10 kilo-Hertz and 1000 kilo-Hertz.

Advantageously, the wires 35 of conductor 33 are embedded in the material of the insulating conductor encasement 34 by extrusion or lamination.

Figure 7:
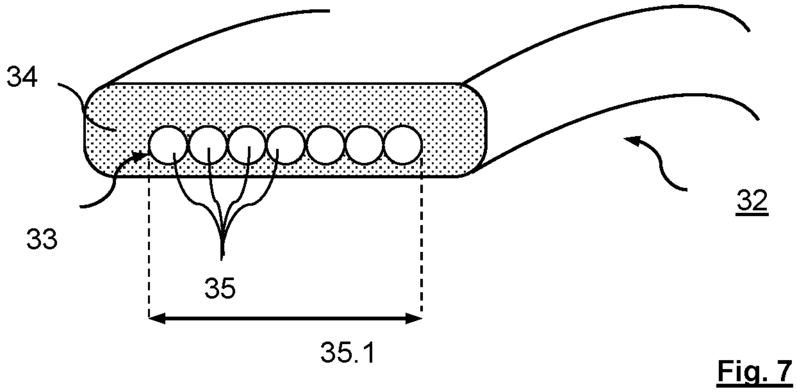
FIG. 7 shows a second embodiment of a composite cable useable in an aerosol-generating system according to the present invention.

FIG. 7 shows a second embodiment of the composite cable 32 which is very similar to the first embodiment of the composite cable 32 as shown in FIG. 6. Therefore, identical or similar features are denoted with identical reference numbers. In contrast to the first embodiment, the composite cable 32 according to FIG. 7 comprises a conductor 33 which consists of a single layer of seven wires 35. Each of the seven wires 35 has larger diameter than the wires 35 shown in FIG. 6. The diameter is chosen such that the cross-sectional area of the electrical conductor 33 in FIG. 7, that is, the sum of the cross-sectional areas of all seven wires 35, substantially corresponds to the cross-sectional area of the electrical conductor 33 in FIG. 6, that is, to the sum of the cross-sectional area of all twenty-two wires 35. Thus, the composite cable 32 shown in FIG. 6 and the composite cable 32 shown in FIG. 7 have substantially the same electrical properties, in particular substantially the same electrical resistance. However, the composite cable 32 according to FIG. 6 is more flexible due to the larger number and smaller diameter of the wires 35.

Figure 8:
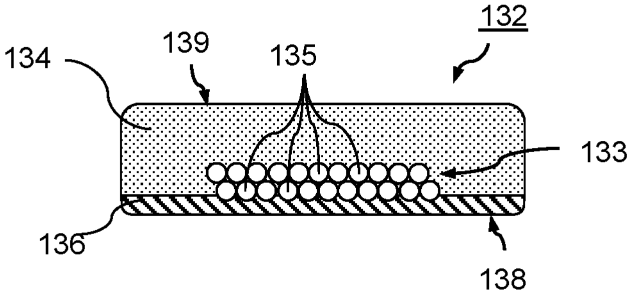
FIG. 8 shows a third embodiment of a composite cable useable in an aerosol-generating system according to the present invention.
Figure 9:
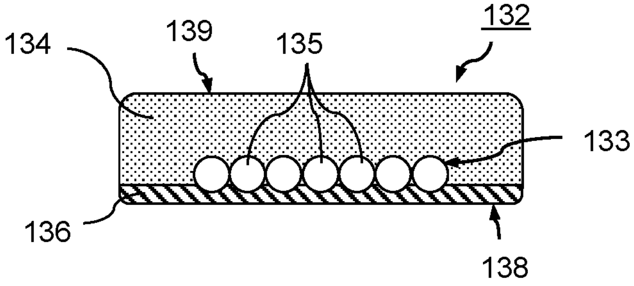
FIG. 9 shows a fourth embodiment of a composite cable useable in an aerosol-generating system according to the present invention.
Figure 10:
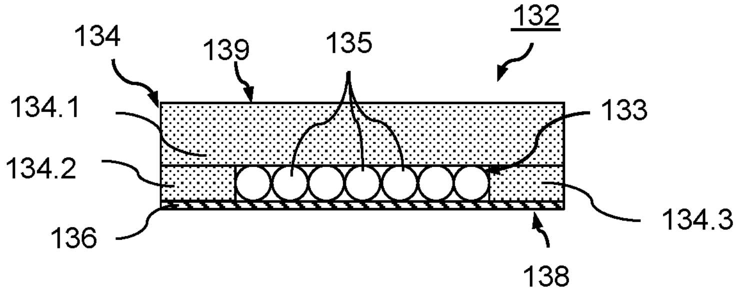
FIG. 10 shows a fifth embodiment of a composite cable useable in an aerosol-generating system according to the present invention.

FIG. 8-10 show three further embodiments of the composite cable 132. In all three embodiments, the composite cable 132 is realized as a multi-layer composite cable 132 which comprises an electrically insulating conductor encasement layer 134 forming the insulating conductor encasement as described above and, addition to that, a support layer 136. Both layers 134, 136 fully enclose the electrical conductor 133. Advantageously, the different layers may be attached to each other by means of a lamination process.

The support layer 136 serves to increase the mechanical resistance of the composite cable 134. In order not to affect the induction performance of the magnetic field generated by the current through the electrical conductor 132, the support layer 136 is electromagnetically inert in all three embodiments. For example, the support layer 136 may be made of polyetheretherketone or polyaryletherketone, both of which are electromagnetic inert materials.

In all three embodiments, the respective support layer 136 is an edge layer, in particular an edge layer forming the first side 138 of the composite cable 132.

In the embodiments shown in FIGS. 8 and 9, the electrical conductor 133 is at least partially embedded in the respective support layer 136 and partially embedded in the insulating conductor encasement layer 134. Apart from the support layer 136 and the partial embedment in the insulating conductor encasement layer, the composite cables 132 shown in FIGS. 8 and 9 are very similar to the composite cables 32 shown in FIGS. 6 and 7, respectively. Therefore, identical or similar features are denoted with the same reference signs, yet incremented by 100.

In contrast, in the embodiment shown in FIG. 10, the electrical conductor 133 is not embedded in the support layer 136. Instead, the support layer 136 covers that side of the electrical conductor 133 which faces inwards towards the cavity when the composite cable 132 is arranged around the cavity 20. Accordingly, the support layer 136 is thinner than the support layer 136 in FIGS. 8 and 9. Further in contrast to the embodiments shown in FIGS. 8 and 9, the insulating conductor encasement layer 134 of the cable 132 shown in FIG. 10 consists of three parts: a first part 134.1 arranged on a side of the conductor 133 opposite to the first side 138 as well as a second part 134.2 and a third part 134.3 arranged laterally to the narrow sides of the flat conductor 133. Furthermore, the composited cable 132 according to FIG. 10 does not have rounded edges, but rather sharp edges.

In the embodiments according to FIGS. 8 and 9, the support layer 136 may have a layer thickness in a range between 0.1 millimeter and 1 millimeter, in particular between 0.2 millimeter and 0.5 millimeter. Likewise, in the embodiment according to FIG. 10, the support layer 136 may have a layer thickness in range between 0.25 millimeter and 1 millimeter, in particular between 0.25 millimeter and 0.5 millimeter.

The insulating conductor encasement layer 134 may have a total layer thickness in a range between 0.5 millimeter and 7 millimeter, in particular between 0.7 millimeter and 4 millimeter or between 0.7 millimeter and 3 millimeter, or in a range between 0.4 millimeter and 7.2 millimeter, in particular between 0.45 millimeter and 2.6 millimeter. Likewise, a portion of the insulating conductor encasement layer 134 embedding the conductor on a side opposite to the first side, in particular the first part 134.1, may have a thickness in a range between 0.2 millimeter and 5 millimeter, in particular 0.2 millimeter and 1.5 millimeter.

Figure 11:
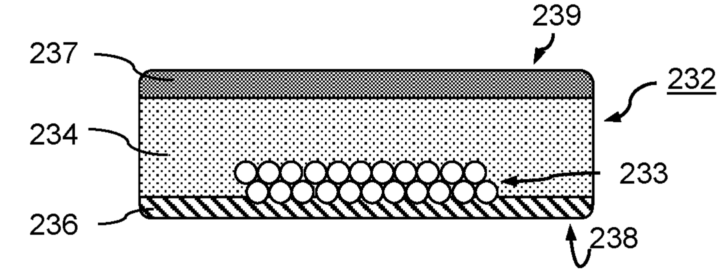
FIG. 11 shows a sixth embodiment of a composite cable useable in an aerosol-generating system according to the present invention.
Figure 12:
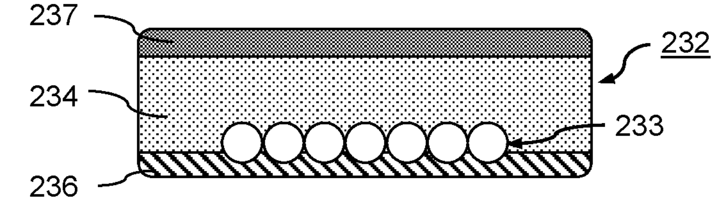
FIG. 12 shows a seventh embodiment of a composite cable useable in an aerosol-generating system according to the present invention.
Figure 13:
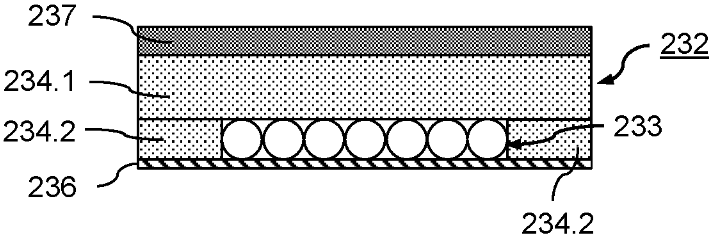
FIG. 13 shows an eighth embodiment of a composite cable useable in an aerosol-generating system according to the present invention.

FIG. 11-13 show yet another three embodiments of the composite cable 232 which are similar to the embodiments shown in FIG. 8-10. Therefore, identical or similar features are denoted with the same reference signs, yet incremented by 100. In contrast to the embodiments shown in FIG. 8-10, the composite cables 232 shown in FIG. 11-13 additionally comprise a shield layer 237 arranged on top of the insulating conductor encasement layer 234 opposite to the support layer 236. The shield layer 237 primarily serves to reduce adverse effects of the magnetic field in regions outside the shield layer 237 and, vice versa, to reduce distortion of the magnetic field by electrically conductive or highly magnetically susceptible materials in the immediate vicinity of the device, or in the housing of the device itself. Accordingly, the shield layer 237 preferably comprises a conductive material, such as a metal coating applied on a side of the electrically insulating conductor encasement layer facing outwards away from the cavity. This can be further seen from FIG. 11-13, the respective shield layer 237 is an edge layer forming the second side 239 of the multi-layer composite cable 232.

The shield layer 237 may have a layer thickness in a range between 0.3 millimeter and 3 millimeter, in particular between 0.3 millimeter and 2 millimeter.

To compensate for the additional layer 237, the layer thickness of the insulating conductor encasement layer 234 in the embodiments shown in FIG. 11-13 may be different from the respective layer thicknesses in the embodiments shown in FIG. 8-10. Accordingly, the insulating conductor encasement layer of the embodiments shown in FIG. 11-13 may have a total layer thickness in a range between 0.2 millimeter and 6 millimeter, in particular between 0.4 millimeter and 2 millimeter, or in a range between 0.4 millimeter and 9.2 millimeter, in particular between 0.45 millimeter and 3.1 millimeter. Likewise, a portion of the insulating conductor encasement layer 234 embedding the conductor on a side opposite to the first side, in particular the first part 234.1, may have a thickness in a range between 0.2 millimeter and 7 millimeter, in particular 0.2 millimeter and 2 millimeter.

Figure 14:
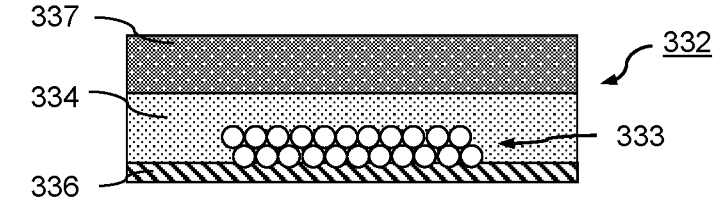
FIG. 14 shows a ninth embodiment of a composite cable useable in an aerosol-generating system according to the present invention.
Figure 15:
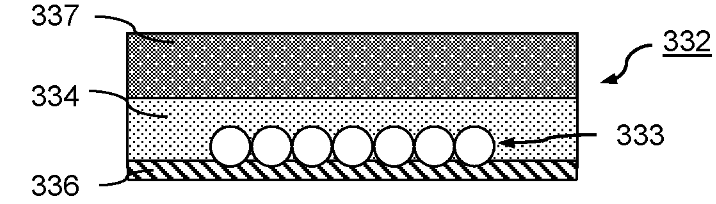
FIG. 15 shows a tenth embodiment of a composite cable useable in an aerosol-generating system according to the present invention.
Figure 16:
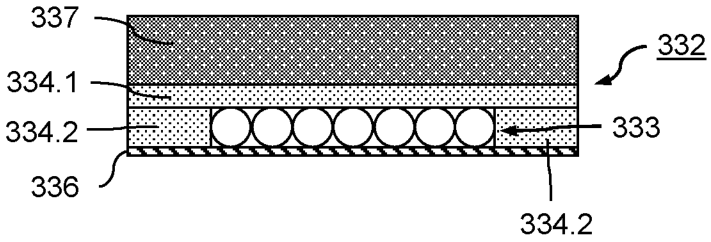
FIG. 16 shows an eleventh embodiment of a composite cable useable in an aerosol-generating system according to the present invention.

FIG. 14-16 show yet another three embodiments of the composite cable 332 which are similar to the embodiments shown in FIG. 11-13. Therefore, identical or similar features are denoted with the same reference signs, yet incremented by 100. In contrast to the embodiments shown in FIG. 11-13, the composite cables 332 shown in FIG. 14-16 comprises a flux concentrator layer 337, instead of a shield layer. For example, the flux concentrator layer 337 may comprise a ferrite material. The ferrite material acts as flux concentrator material. Furthermore, the layer thicknesses are slightly different to those of the embodiment shown in FIG. 11-13. Here, the insulating conductor encasement layer 334 of the embodiments shown in FIG. 14-16 may have a total layer thickness in range between 0.15 millimeter and 3 millimeter, in particular between 0.3 millimeter and 1 millimeter, or in a range between 0.45 millimeter and 3.7 millimeter, in particular between 0.5 millimeter and 2.85 millimeter. Likewise, a portion of the insulating conductor encasement layer 334 embedding the conductor on a side opposite to the first side, in particular the first part 334.1, may have a thickness in a range between 0.25 millimeter and 1.5 millimeter, in particular between 0.25 millimeter and 0.75 millimeter. The flux concentrator layer 337 may have a layer thickness in range between 0.25 millimeter and 5.5 millimeter, in particular between 0.25 millimeter and 1.75 millimeter.

Figure 17:
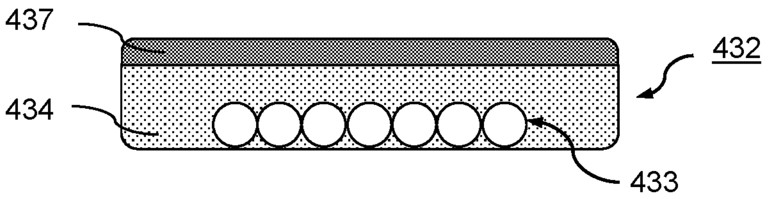
FIG. 17 shows a twelfth embodiment of a composite cable useable in an aerosol-generating system according to the present invention.
Figure 18:
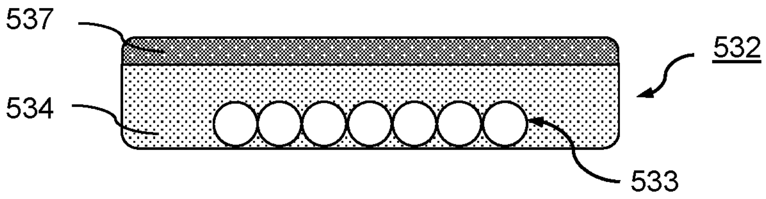
FIG. 18 shows a thirteenth embodiment of a composite cable useable in an aerosol-generating system according to the present invention.
Figure 19:
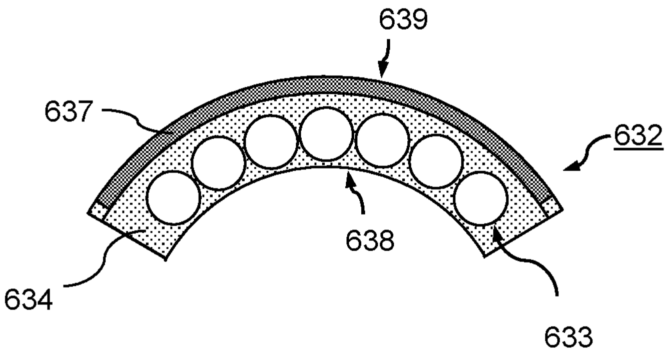
FIG. 19 shows a fourteenth embodiment of a composite cable useable in an aerosol-generating system according to the present invention.

As shown in FIG. 17, it is also possible that the composite cable 432 does not comprise a support layer, but only a shield layer 437 and an insulating conductor encasement layer 434 in which the conductor 433 is embedded. Alternatively, as shown in FIG. 18, it is also possible that the composite cable 532 only comprises a flux concentrator layer 537 and an insulating conductor encasement layer 534 in which the conductor 533 is embedded, but no support layer. In this configuration, the As shown in FIG. 19 the composite cable 632 may also comprise a cross-section other than a substantially rectangular cross-section as shown in FIG. 1-18. In the present embodiment, the composite cable 632 has an arc-shaped cross-section. The cable 632 is also a multi-layer composite cable comprising a shield layer or a flux concentrator layer 637 and an insulating conductor encasement layer 634 in which a substantially arc-shaped conductor 633 is embedded. With regard to the arc-shaped cross-section, the width dimension of the composite is measured along the first side 638 or along the second side 639 or along a midline between the first side 538 and the second side 639 which is parallel to the first side 638 and the second side 539. Likewise, the thickness dimension may be measured in the radial direction along an axis normal to the first side 638 and the second side 639.

Figure 20:
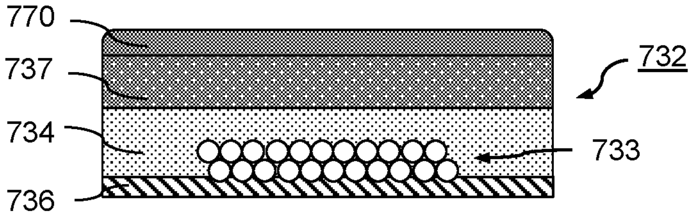
FIG. 20 shows a fifteenth embodiment of a composite cable useable in an aerosol-generating system according to the present invention.

FIG. 20 shows another embodiment of a multi-layer composite cable 732 which is a combination of the composite cable according to FIGS. 11 and 14. The multi-layer composite cables 732 comprises a support layer 736, an insulating conductor encasement layer 734 on top of the support layer 736 in which a conductor 733 is embedded, a flux concentrator layer 737 on top of the insulating conductor encasement layer 734 and a shield layer 770 arranged on top of the flux concentrator layer 737 opposite to the support layer 736. The shield layer 770 may be, for example, a metallic coating on top of the flux concentrator layer 737.

Figure 21:
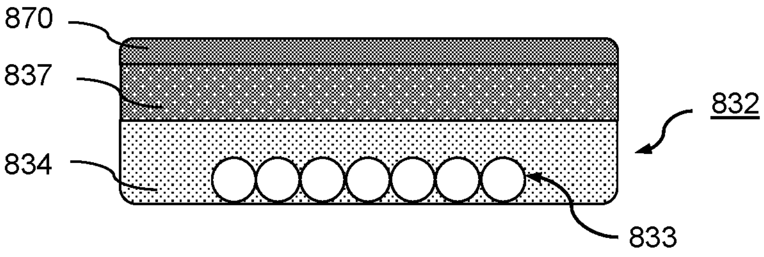
FIG. 21 shows a sixteenth embodiment of a composite cable useable in an aerosol-generating system according to the present invention.

As shown on FIG. 21, it is also possible to omit the support layer, like in FIG. 17 and FIG. 18. Accordingly, FIG. 21 shows yet another embodiment of a multi-layer composite cable 832 which is a combination of the composite cable according to FIGS. 17 and 18. The multi-layer composite cables 832 comprises a conductor 833 embedded in an insulating conductor encasement layer 834, a flux concentrator layer 837 on top of the insulating conductor encasement layer 834 and a shield layer 870 arranged on top of the flux concentrator layer 837.

In FIG. 14-16, FIG. 18 and FIG. 20-21, the respective insulating conductor encasement layer 334, 535, 734, 834 preferably does not comprise any flux concentrator material due to the presence of the respective additional flux concentrator layer 337, 537, 737 837. However, it is also possible that the respective insulating conductor encasement layer 334, 535, 734, 834 comprises a flux concentrator material in addition to the respective flux concentrator layer 337, 537, 737 837.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent of A.

The invention claimed is:

1. An aerosol-generating device for generating an aerosol by inductively heating an aerosol-forming substrate, the aerosol-generating device comprising:
- a device housing comprising a cavity configured to removably receive at least a portion of the aerosol-forming substrate to be heated;
- an inductive heating arrangement comprising an induction coil configured to generate an alternating magnetic field within the cavity in a range between 500 kHz to 30 MHZ,
- wherein the induction coil is formed by a plurality of turns of a composite cable arranged around at least a portion of the cavity,
- wherein the composite cable comprises a first side facing inward towards the cavity, a second side opposite to the first side facing outward away from the cavity, and an electrical conductor embedded at least partially in an insulating conductor encasement,
- wherein the electrical conductor comprises a plurality of non-insulated wires in electrical contact with each other, and
- wherein the electrical conductor is arranged asymmetrically with regard to an outer cross-section of the composite cable so as to be closer to the first side of the composite cable than to the second side of the composite cable.

2. The aerosol-generating device according to claim 1,
- wherein the non-insulated wires run parallel to each other along a length extension of the composite cable in a single layer, or
- wherein the non-insulated wires run parallel to each other along a length extension of the composite cable in a plurality of layers on top of each other.

3. The aerosol-generating device according to claim 2,
- wherein the single layer or each of the plurality of layers is a flat layer, or
- wherein the single layer or each of the plurality of layers is a curved layer.

4. The aerosol-generating device according to claim 1, wherein the composite cable has a substantially circular outer cross-section.

5. The aerosol-generating device according to claim 1, wherein the composite cable has a substantially non-circular outer cross-section.

6. The aerosol-generating device according to claim 1, wherein the composite cable has a substantially rectangular outer cross-section, or a substantially square outer cross-section, or a substantially elliptical outer cross-section, or a substantially oval outer cross-section, or a substantially parallelogram-shaped outer cross-section, or a substantially trapezoid outer cross-section, or a substantially arc-shaped outer cross-section.

7. The aerosol-generating device according to claim 1,
- wherein the composite cable is a flat cable, and/or
- wherein the electrical conductor is a flat conductor.

8. The aerosol-generating device according to claim 1, wherein the electrical conductor has a substantially rectangular outer cross-section, or a substantially square outer cross-section, or a substantially elliptical outer cross-section, or a substantially oval outer cross-section, or a substantially parallelogram-shaped outer cross-section, or a substantially trapezoid outer cross-section, or a substantially arc-shaped outer cross-section.

9. The aerosol-generating device according to claim 1, wherein the insulating conductor encasement comprises a magnetic flux concentrator material being a material or materials having a relative maximum magnetic permeability of at least 1000, for frequencies up to 50 kHz and a temperature of 25 degrees Celsius.

10. The aerosol-generating device according to claim 1, wherein the insulating conductor encasement comprises a magnetic flux concentrator material being a material or materials having a relative maximum magnetic permeability of at least 10000, for frequencies up to 50 kHz and a temperature of 25 degrees Celsius.

11. The aerosol-generating device according to claim 1, wherein the composite cable is a multi-layer composite cable comprising an electrically insulating conductor encasement layer forming the insulating conductor encasement, and at least one of a support layer, a flux concentrator layer, or a shield layer.

12. The aerosol-generating device according to claim 11, wherein the support layer comprises an electromagnetic inert material being at least one of polyetheretherketone or polyaryletherketone.

13. The aerosol-generating device according to claim 11, wherein the support layer is an edge layer forming the first side of the composite cable, and wherein one of the flux concentration layer or the shield layer is an edge layer forming the second side of the composite cable.

14. The aerosol-generating device according to claim 11, wherein the shield layer comprises an electrically conductive material being at least one of aluminum, copper, tin, steel, gold, silver, an electrically conductive polymer, a ferrite, or any combination thereof.

15. The aerosol-generating device according to claim 1, further comprising at least one susceptor arranged at least partially within the cavity.

16. An aerosol-generating system, comprising:

an aerosol-generating device according to claim 1; and an aerosol-generating article received or receivable at least partially in the cavity of the device, the aerosol-generating article comprising the aerosol-forming substrate to be heated.

17. The aerosol-generating system according to claim 16, wherein the aerosol-generating article further comprises at least one susceptor positioned in thermal proximity to or thermal contact with the aerosol-forming substrate so that the at least one susceptor is inductively heatable by the inductive heating arrangement when the article is received in the cavity of the aerosol-generating device.

* * * * *